US012659826B2

(12) United States Patent
　　Akl et al.

(10) Patent No.: US 12,659,826 B2
(45) Date of Patent: Jun. 16, 2026

(54) RADIO RESOURCE CONTROL MESSAGING AND LAYER 1/LAYER 2 TRIGGERED MOBILITY

(71) Applicant: QUALCOMM Incorporated, San Diego, CA (US)

(72) Inventors: Naeem Akl, Bridgewater, NJ (US); Jelena Damnjanovic, Del Mar, CA (US); Karl Georg Hampel, Jersey City, NJ (US); Masato Kitazoe, Hachiouji (JP); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/440,469

(22) Filed: Feb. 13, 2024

(65) Prior Publication Data

US 2024/0284283 A1 　Aug. 22, 2024

Related U.S. Application Data

(60) Provisional application No. 63/485,508, filed on Feb. 16, 2023.

(51) Int. Cl.
　　*H04W 36/08* 　(2009.01)
　　*H04W 36/00* 　(2009.01)

(52) U.S. Cl.
　　CPC ....... *H04W 36/08* (2013.01); *H04W 36/0055* (2013.01)

(58) Field of Classification Search
　　CPC .......................... H04W 36/08; H04W 36/0055
　　USPC ........................................................ 455/436
　　See application file for complete search history.

(56) References Cited

U.S. PATENT DOCUMENTS

| | | | | |
|---|---|---|---|---|
| 2018/0279188 A1* | 9/2018 | Tenny | ............... | H04W 36/0016 |
| 2020/0145146 A1* | 5/2020 | Decarreau | ............. | H04W 80/08 |
| 2023/0388871 A1* | 11/2023 | Guo | .................. | H04W 36/0069 |
| 2025/0274827 A1* | 8/2025 | Abdul | ............... | H04W 36/0079 |

* cited by examiner

*Primary Examiner* — Don N Vo

(74) *Attorney, Agent, or Firm* — Procopio, Cory, Hargreaves & Savitch LLP

(57) ABSTRACT

A wireless device is configured to. receive, from a cell, an indication of invalidity for at least one of: a radio resource control (RRC) message for the wireless device updating a layer 1/layer 2 triggered mobility (LTM) candidate configuration, or a packet data protocol convergence (PDCP) sequence number (SN). The wireless device skips the PDCP SN for PDCP reordering.

23 Claims, 23 Drawing Sheets

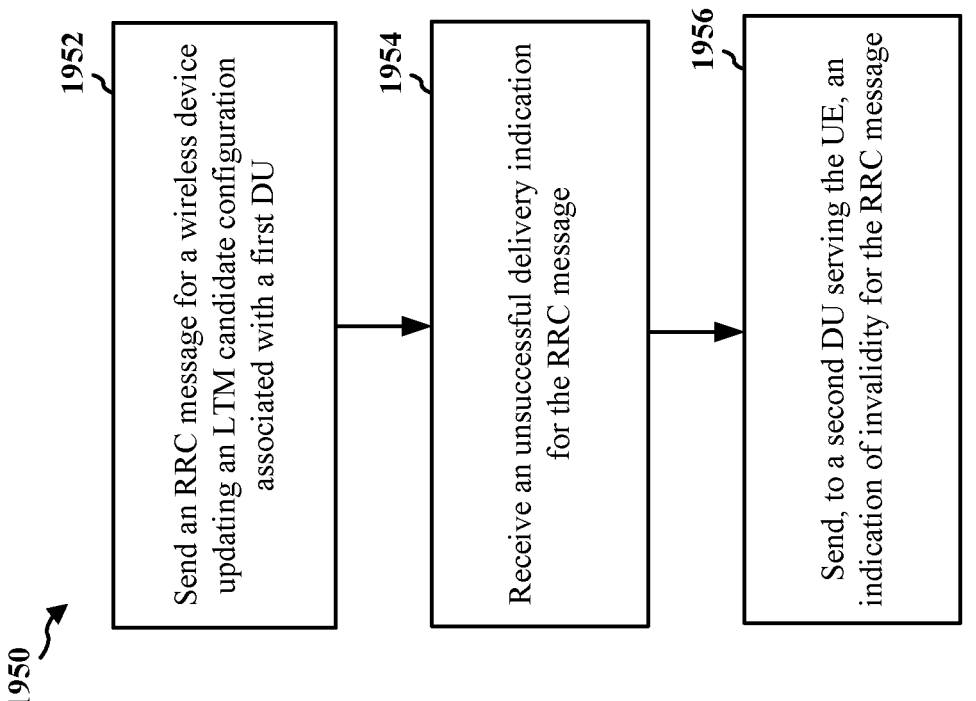

1950

1952 Send an RRC message for a wireless device updating an LTM candidate configuration associated with a first DU 1954 Receive an unsuccessful delivery indication for the RRC message 1956 Send, to a second DU serving the UE, an indication of invalidity for the RRC message

FIG. 19B

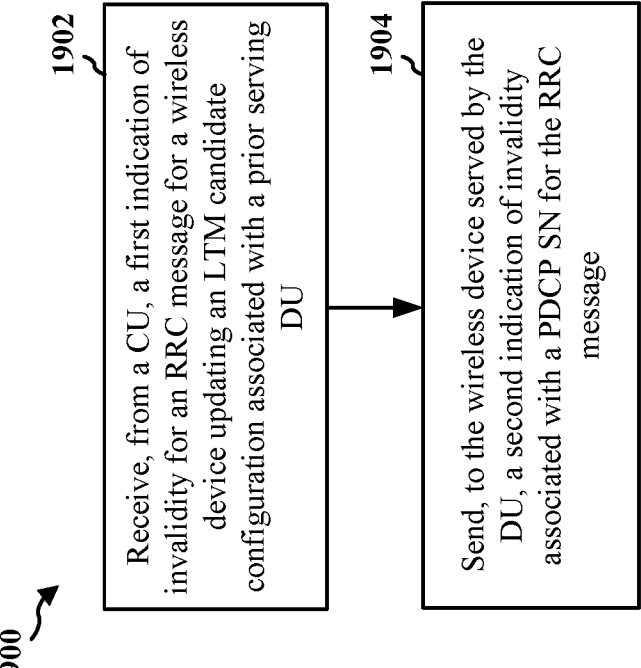

1900

1902 Receive, from a CU, a first indication of invalidity for an RRC message for a wireless device updating an LTM candidate configuration associated with a prior serving DU 1904 Send, to the wireless device served by the DU, a second indication of invalidity associated with a PDCP SN for the RRC message

FIG. 19A

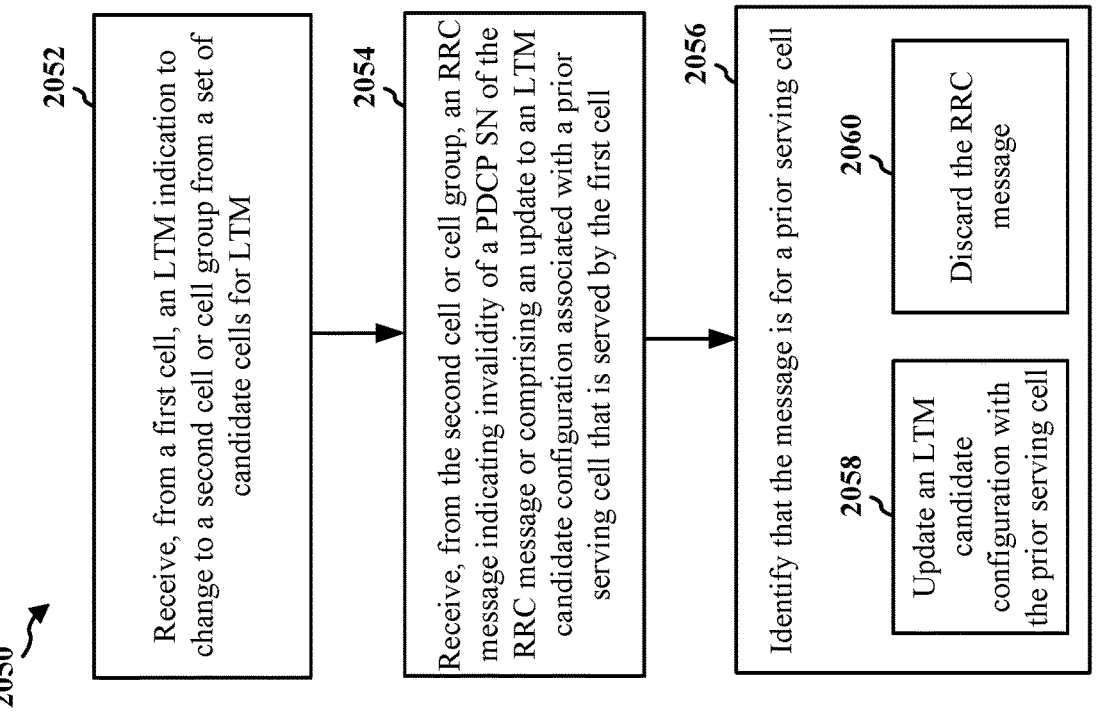

2050

2052

Receive, from a first cell, an LTM indication to change to a second cell or cell group from a set of candidate cells for LTM

2054

Receive, from the second cell or cell group, an RRC message indicating invalidity of a PDCP SN of the RRC message or comprising an update to an LTM candidate configuration associated with a prior serving cell that is served by the first cell

2056

Identify that the message is for a prior serving cell

2058

Update an LTM candidate configuration with the prior serving cell

2060

Discard the RRC message

Receive, from a cell, an indication of invalidity for an RRC message and/or PDCP SN

2004

Skip the PDCP SN for PDCP reordering

Receive, from a first cell, an LTM indication for a change

2104

Identify a gap in PDCP SNs for PDCP reordering following the change

2106

Skip a PDCP SN in the PDCP reordering

RADIO RESOURCE CONTROL MESSAGING AND LAYER 1/LAYER 2 TRIGGERED MOBILITY

CROSS REFERENCE TO RELATED APPLICATION(S)

This application claims the benefit of and priority to U.S. Provisional Application Ser. No. 63/485,508, entitled "Radio Resource Control Messaging and Layer1/Layer2 Triggered Mobility" and filed on Feb. 16, 2023, which is expressly incorporated by reference herein in its entirety.

TECHNICAL FIELD

The present disclosure relates generally to communication systems, and more particularly, to wireless communication including layer 1 (L1)/layer 2 (L2) triggered mobility (LTM).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a distributed unit (DU). The apparatus sends to a central unit (CU) an indication of a layer 1/layer 2 triggered mobility (LTM) change for a wireless device from the first DU to a second DU; receives a response from the CU; and sends, after notifying the CU, a medium access control-control element (MAC-CE) for the wireless device indicating the LTM change to the second DU.

In an aspect of the disclosure, a method, a computer-readable medium, and an apparatus are provided for wireless communication at a CU. The apparatus receives, from a first DU, an indication of an upcoming LTM change for a wireless device from the first DU to a second DU and sends a response to the DU. The CU skips sending a candidate configuration associated with the first DU for the wireless device after receiving the indication of the LTM change to the second DU if the response approves the LTM change and sends the candidate configuration associated with the first DU if the response does not approve the LTM change.

In an aspect of the disclosure, a method, a computer-readable medium, and an apparatus are provided for wireless communication at a DU. The apparatus receives from a CU, a first indication of invalidity for a radio resource control (RRC) message for a wireless device updating a LTM candidate configuration associated with a prior serving DU that previously served the wireless device. The DU sends, to the wireless device served by the DU, a second indication of invalidity associated with a packet data protocol convergence (PDCP) sequence number (SN) for the RRC message.

In an aspect of the disclosure, a method, a computer-readable medium, and an apparatus are provided for wireless communication at a CU. The apparatus sends an RRC message for a wireless device updating a LTM candidate configuration associated with a first DU. The CU receives an unsuccessful delivery indication for the RRC message; and sends, to a second DU serving the UE, an indication of invalidity for the RRC message.

In an aspect of the disclosure, a method, a computer-readable medium, and an apparatus are provided for wireless communication at a wireless device. The apparatus receives from a cell, an indication of invalidity for at least one of: an RRC message for a wireless device updating a LTM candidate configuration, or a PDCP SN. The apparatus skips the PDCP SN for PDCP reordering.

In an aspect of the disclosure, a method, a computer-readable medium, and an apparatus are provided for wireless communication at a wireless device. The apparatus receives, from a first cell, an LTM indication to change to a second cell or cell group from a set of candidate cells for LTM and receives from the second cell or cell group, an RRC message indicating invalidity of a PDCP SN of the RRC message or comprising an update to an LTM candidate configuration associated with a prior serving cell that is served by the first cell. The wireless identifies that the message is for a prior serving cell.

In an aspect of the disclosure, a method, a computer-readable medium, and an apparatus are provided for wireless communication at a wireless device. The apparatus receives, from a cell, an LTM indication for a change to a second cell from a set of candidate cells for LTM. The apparatus identifies a gap in PDCP SNs for PDCP reordering following the change to the second cell and skips a PDCP SN in the PDCP reordering.

To the accomplishment of the foregoing and related ends, the one or more aspects may include the features hereinafter fully described and particularly pointed out in the claims.

The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 19A is a flowchart of a method of wireless communication at a DU, in accordance with various aspects of the present disclosure.

FIG. 19B is a flowchart of a method of wireless communication at a DU, in accordance with various aspects of the present disclosure.

FIG. 20A is a flowchart of a method of wireless communication at a wireless device, in accordance with various aspects of the present disclosure.

FIG. 20B is a flowchart of a method of wireless communication at a wireless device, in accordance with various aspects of the present disclosure.

DETAILED DESCRIPTION

Figure 1:
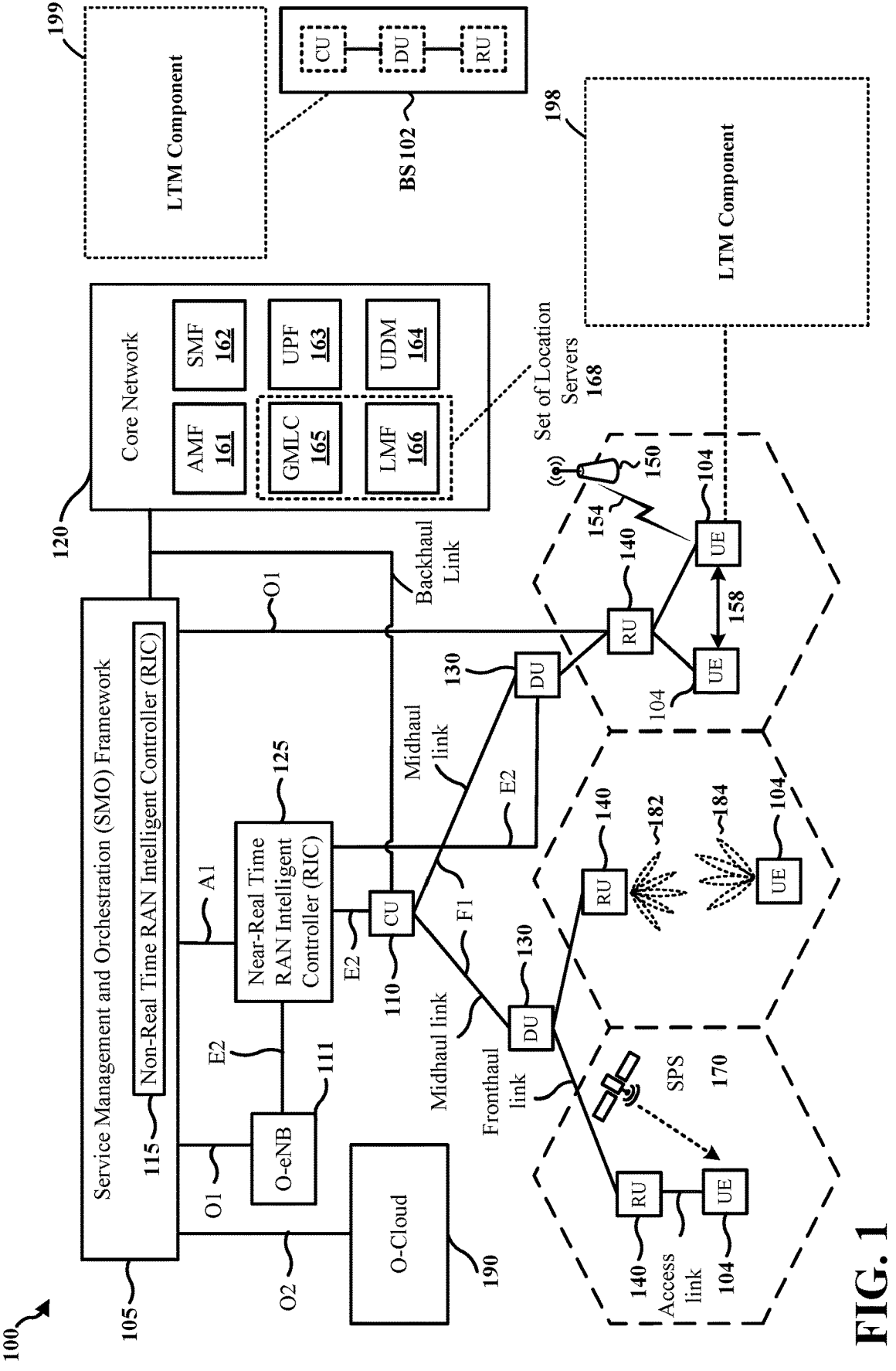
FIG. 1 is a diagram illustrating an example of a wireless communications system and an access network.

A UE may perform LTM changes between serving cells, which may provide time efficiencies in comparison to a layer 3 cell change. As an example, a UE may perform an LTM change from a first DU to a second DU. A CU may not be aware of the LTM change prior to an occurrence of the change and may send an RRC message with a configuration associated with the first DU to the UE. As the UE is not served by the first DU, the UE does not receive the RRC message, which can lead to a PDCP SN gap or a PDCP count gap for PDCP reordering. Each PDCP SN may be used for a single message as integrity protection. When the UE receives messages, it reorders them based on a PDCP count and provides them to a higher layer. If a PDCP SN is missing, the UE may wait to receive the message until determining an RLF. If the UE does not receive the RRC message with the configuration associated with the first DU, the UE may determine an RLF based on the PDCP SN gap, which may significantly add to the reordering delay of the PDCP PDUs and affect the communication between the UE and the network. If the UE receives a retransmission of the configuration for the first DU via the second DU, the configuration is outdated because the UE is no longer served by the first DU. The receipt of the outdated configuration may trigger an RLF if the UE fails to apply the RRC message. Aspects presented herein enable a prevention of the CU from sending outdated RRC configurations, and/or enables a DU and/or UE to handle an RRC configuration for a period serving cell following an LTM change. The aspects presented herein enable improved communication between the UE and the network following LTM changes and help to avoid RLF.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 5:
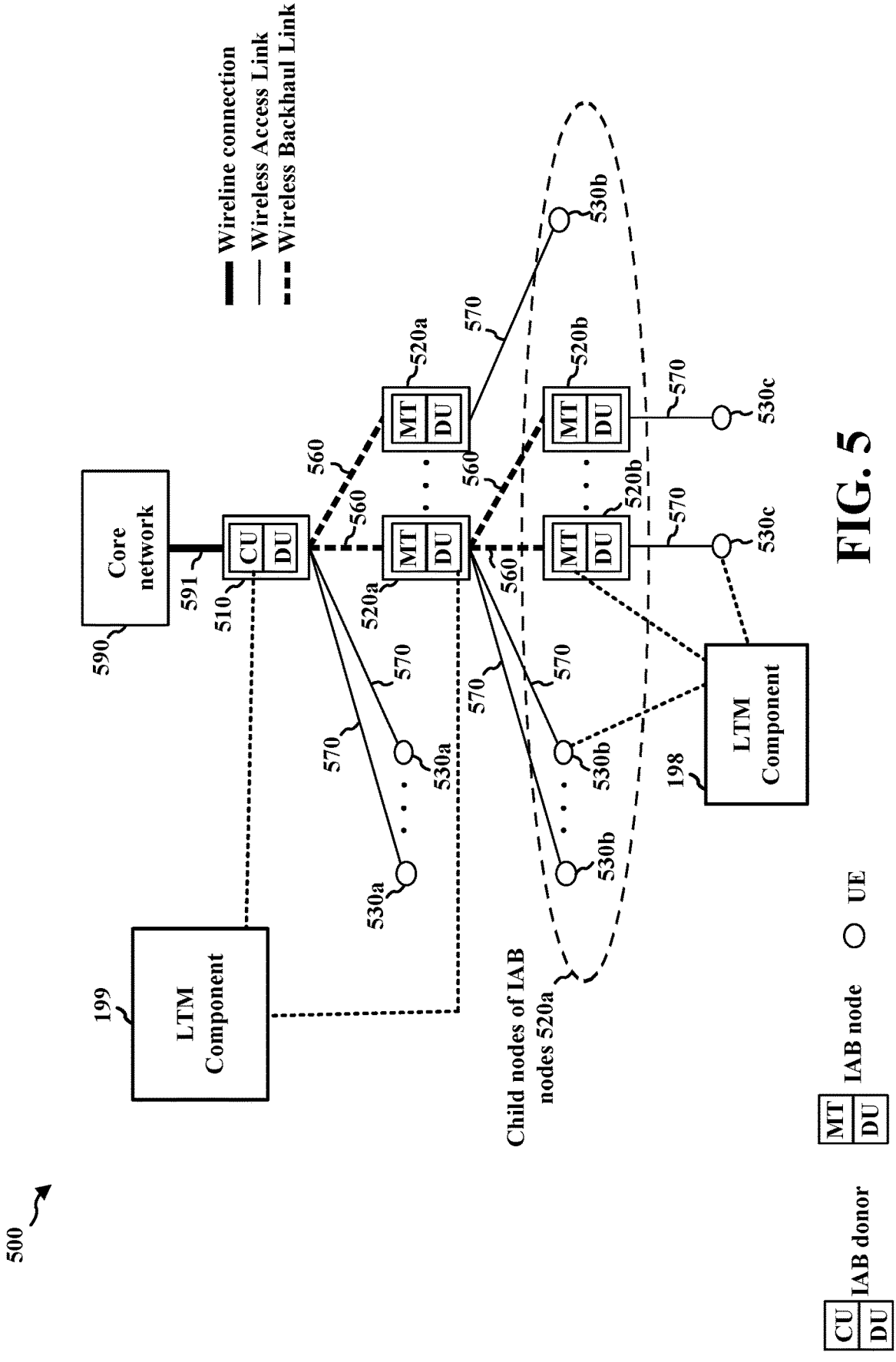
FIG. 5 is a diagram illustrating an IAB network, in accordance with various aspects of the present disclosure.
Figure 6:
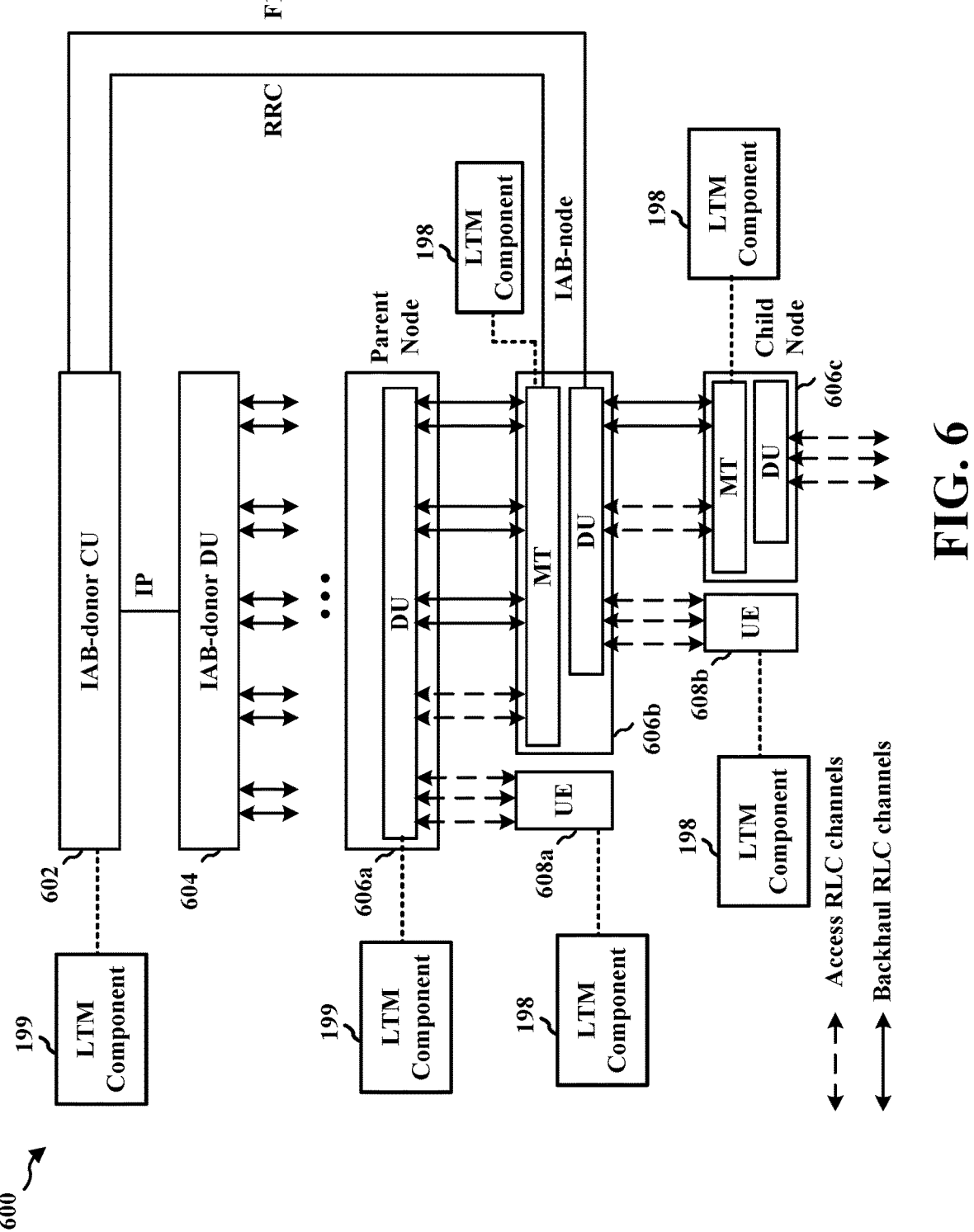
FIG. 6 is a diagram illustrating radio link control (RLC) channels in an IAB network, in accordance with various aspects of the present disclosure.

Referring again to FIG. 1, in some aspects, the UE 104 may have an LTM component 198 that may be configured to receive, from an IAB-DU (e.g., from a cell), a MAC-CE including an indication of invalidity for at least one of: an RRC message for a wireless device updating an LTM candidate configuration associated with a prior serving IAB-DU, or a PDCP SN; and skip the PDCP SN for PDCP reordering. In some aspects the LTM component 198 may be configured to receive, from a first IAB-DU (e.g., a first cell), an LTM indication to change to a second IAB-DU (e.g., a second cell) from a set of candidate IAB-DUs for LTM; receive from the second IAB-DU, a MAC-CE indicating invalidity of a PDCP SN of the MAC-CE or comprising an update to an LTM candidate configuration associated with the first IAB-DU; and identify that the message is for a prior serving IAB-DU (e.g., a prior serving cell). Although illustrated for a UE 104, an IAB-MT may include the LTM component, e.g., such as shown in FIG. 5 and FIG. 6.

In some aspects, a network node may have an LTM component 199 that may be configured to perform aspects in connection with RRC messages and LTM. As an example, the network node may include a DU, such as an IAB-DU (e.g., as shown in FIGS. 5 and 6), and the LTM component 199 may be configured to send to a CU (e.g., such as an IAB-CU), an indication of an LTM change for a wireless device from the first IAB-DU that to a second IAB-DU and send, after notifying the IAB-CU, a MAC-CE for the wireless device indicating the LTM change to the second IAB-DU. In some aspects, the LTM component 199 may be configured to receive from an IAB-CU, an RRC message for a wireless device updating an LTM candidate configuration associated with a prior serving IAB-DU that previously served the wireless device; and send, to the wireless device served by the IAB-DU, a MAC-CE with a PDCP SN and an indication of invalidity to the wireless device served by the IAB-DU. In some aspects, the network node may be a CU, such as an IAB-CU (e.g., as shown in FIGS. 5 and 6), and the LTM component 199 may be configured to receive, from a first IAB-DU, an indication of an LTM change for a wireless device from the first IAB-DU to a second IAB-DU, and skip sending a candidate configuration associated with the first IAB-DU for the wireless device after receiving the indication of the LTM change to the second IAB-DU. In some aspects, the LTM component 199 may be configured to send an RRC message for a wireless device updating an LTM candidate configuration associated with a prior serving IAB-DU; and send an indication of invalidity for the RRC message.

Figures 2A, 2B, 2C, 2D:
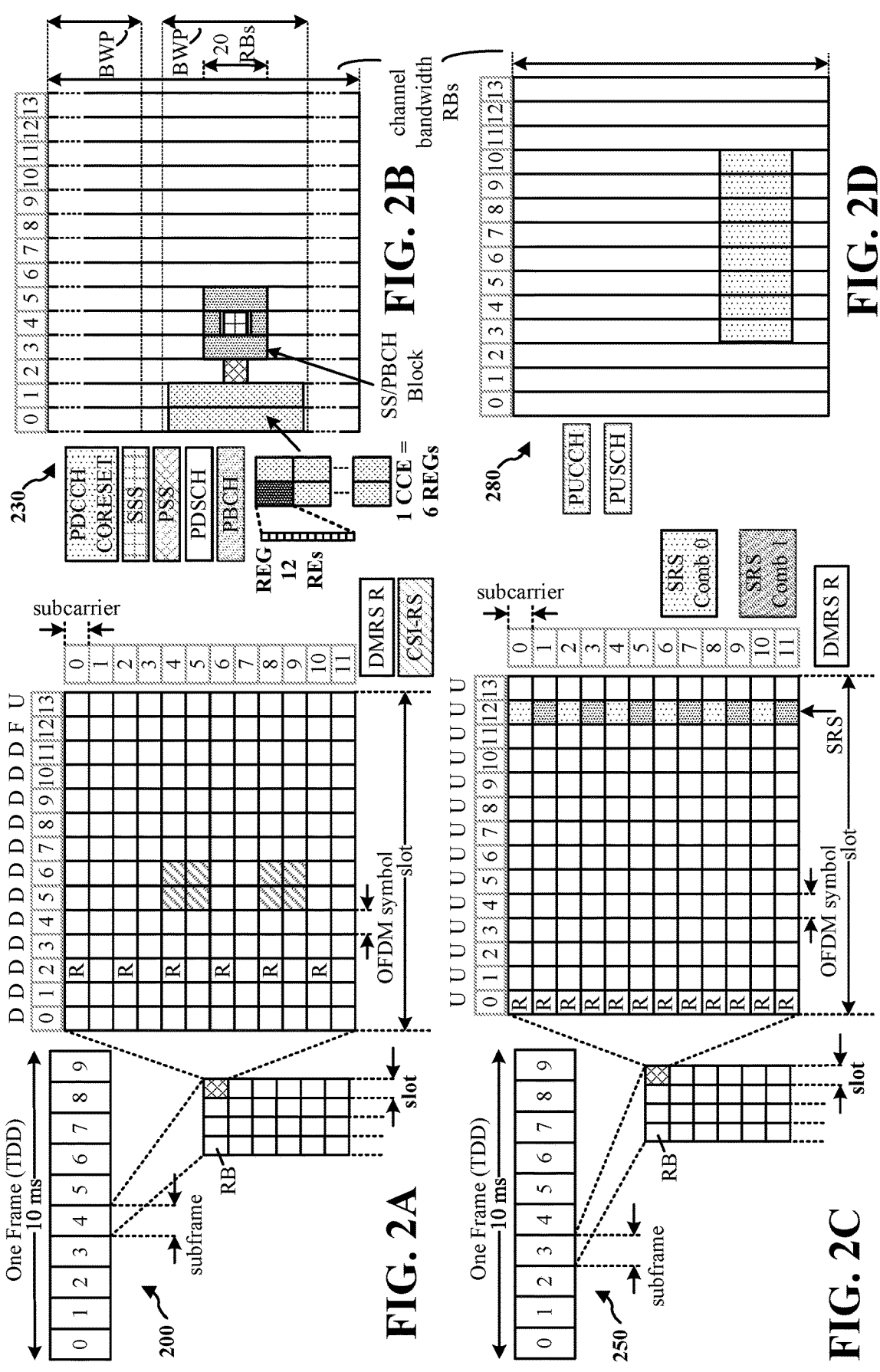
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^\mu \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
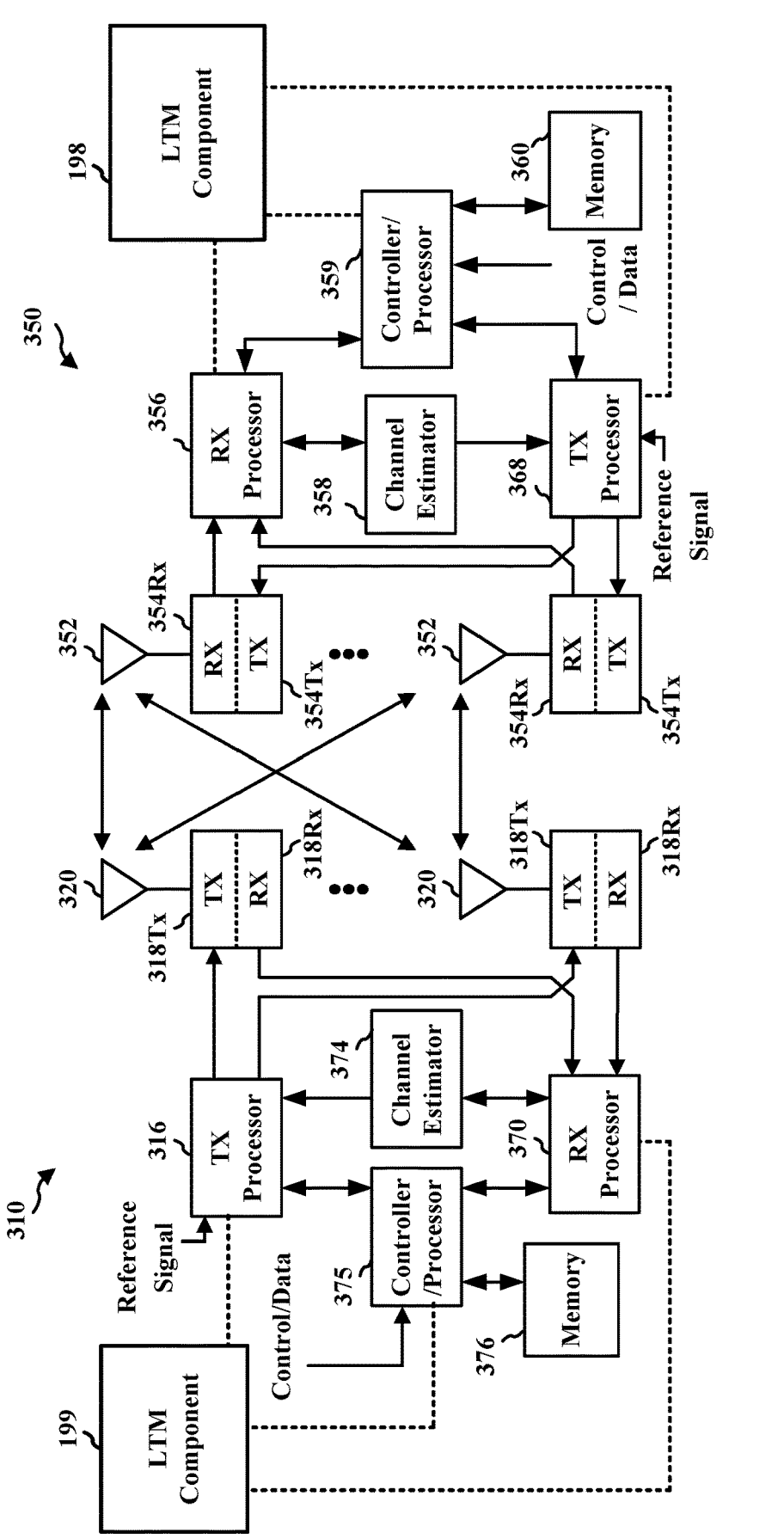
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the LTM component 198 of FIG. 1.

At least one of the TX processor 316, the RX processor 370, and the controller/processor 375 may be configured to perform aspects in connection with the LTM component 199 of FIG. 1.

Figure 4:
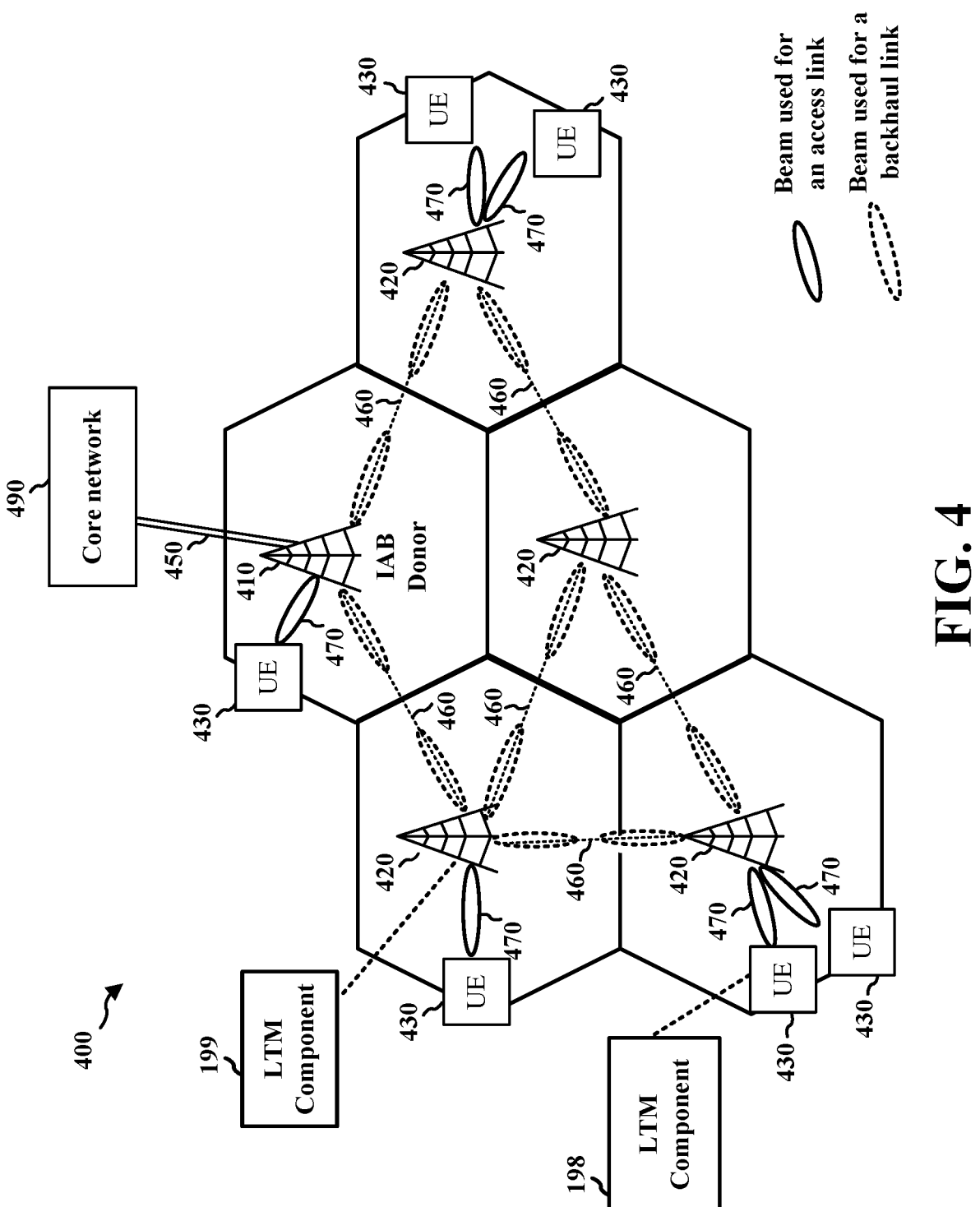
FIG. 4 is a diagram illustrating an integrated access and backhaul (IAB) network, in accordance with various aspects of the present disclosure.

FIG. 4 is a diagram illustrating an IAB network 400. The IAB network provides access network functionality between access nodes (ANs) and other ANs/UEs, and backhaul network functionality between ANs. The ANs include IAB-donors, which have a wireline connection to a core network 490, and IAB nodes, which operate wirelessly and relay traffic to/from IAB-donors through one or more AN hops. The IAB ANs share resources between the access and backhaul. That is, the resources used for access communication between the ANs and the ANs/UEs are also used for backhaul communication between the ANs.

The IAB network 400 may include an anchor node, which may be referred to as an "IAB donor" 410, and access nodes, which may be referred to herein as "IAB nodes" 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to the core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. The UEs 430 communicate with the core network 490 by relaying messages through their respective access link 470 to the IAB network 400, which then may relay the message through backhaul links 460 to the IAB donor 410 to communicate with the core network 490 through the wireline backhaul link 450. Similarly, the core network 490 may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for the IAB donor 410 or the IAB node 420. The PCI value may be used to determine a scrambling sequence that may be applied to physical signals and/or channels that are transmitted by a particular IAB node. For example, a PSS and/or the SSS transmitted by the respective IAB donor 410 or IAB node 420 may be scrambled using a scrambling sequence that may be based on the PCI used by the respective IAB node.

FIG. 5 is a diagram illustrating an IAB network 500 and components thereof. The IAB network 500 includes an IAB donor node 510 and IAB nodes 520a-520b. The IAB nodes 520a-520b, as well as the IAB donor node 510, may provide wireless access links to UEs 530a-530c.

The IAB donor node 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of the IAB donor node 510. The IAB donor node 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor node 510 may include a central unit (CU) and a distributed unit (DU). The CU may provide control for the IAB nodes 520a, 520b in the IAB network 500. For example, the CU may control the IAB network 500 through configuration. The CU may perform RRC/PDCP layer functions. The IAB donor nodes 510 further include a DU that may perform scheduling. For example, the DU may schedule resources for communication by the child IAB nodes 520a and/or UEs 530a of the IAB donor node 510. The DU is associated with radio link control (RLC), media access control (MAC), and physical (PHY) layer functions.

The IAB nodes 520a, 520b may include a mobile termination (MT) and a DU. The IAB node may be an L2 relay node. The MT of IAB node 520a may operate as a scheduled node that may be scheduled similar to a UE 530a by the DU of the parent node, e.g., IAB donor node 510. The MT of IAB node 520b may operate as a scheduled node of parent node 520a. The DU may schedule the child IAB nodes 520b and UEs 530b of the IAB node 520a. An IAB node may provide a connection to an IAB node that in turn provides another connection for another IAB node. The pattern of a parent IAB node comprising a DU that schedules a child IAB node/child UE may continue to more connections.

FIG. 6 is a diagram 600 illustrating RLC channels in an IAB network. As discussed supra, the IAB network provides both access network functionality and backhaul network functionality. The IAB network includes an IAB donor with a CU 602 and a DU 604. In order to provide access network functionality, IAB nodes 606a, 606b, and 606c may communicate with other UEs 608a and 608b and/or MTs of other IAB ANs through access RLC channels. Thus, the IAB nodes 606a, 606b, and 606c operate as access IAB nodes for their child nodes or UEs. In order to provide backhaul network functionality, IAB nodes 606a, 606b, and 606c may route traffic to other IAB nodes (e.g., 606a, 606b, and 606c) through backhaul RLC channels (BH RLC CHs). Thus, the IAB nodes 606a, 606b, and 606c may operate as intermediate IAB nodes when backhauling traffic for other IAB nodes. Access RLC channels include UE-to-DU/DU-to-UE, carrying PDCP for RRC or data radio bearers (DRBs), and MT-to-DU/DU-to-MT, carrying PDCP for RRC (or DRBs). BH RLC CHs include MT-to-DU/DU-to-MT, carrying backhaul adaptation protocol (BAP) messages for backhauling access traffic.

A network node (e.g., a base station, a DU, and IAB-DU, etc.) may change a cell for a UE using an L3 handover (e.g., using RRC signaling). However, L3 handovers may be time-consuming and/or inefficient. A network node may utilize the improved L1/L2 signaling scheme to change one or more cells for a UE in a more rapid manner in comparison to L3 (RRC) based approaches. For example, a UE may receive an L1 or L2 mobility cell configuration for a set of cells for L1 or L2 inter-cell mobility (e.g., L1/L2-triggered mobility, or LTM). The set of cells may include multiple cells, and each cell in the set of cells can be activated or deactivated for data and/or control transfer using L1 or L2 signaling. The UE may receive L1 or L2 signaling indicating multiple activated cells and activate one or more cells in the multiple activated cells in a priority order for the data and/or control transfer using L1 or L2 signaling.

Figure 7:
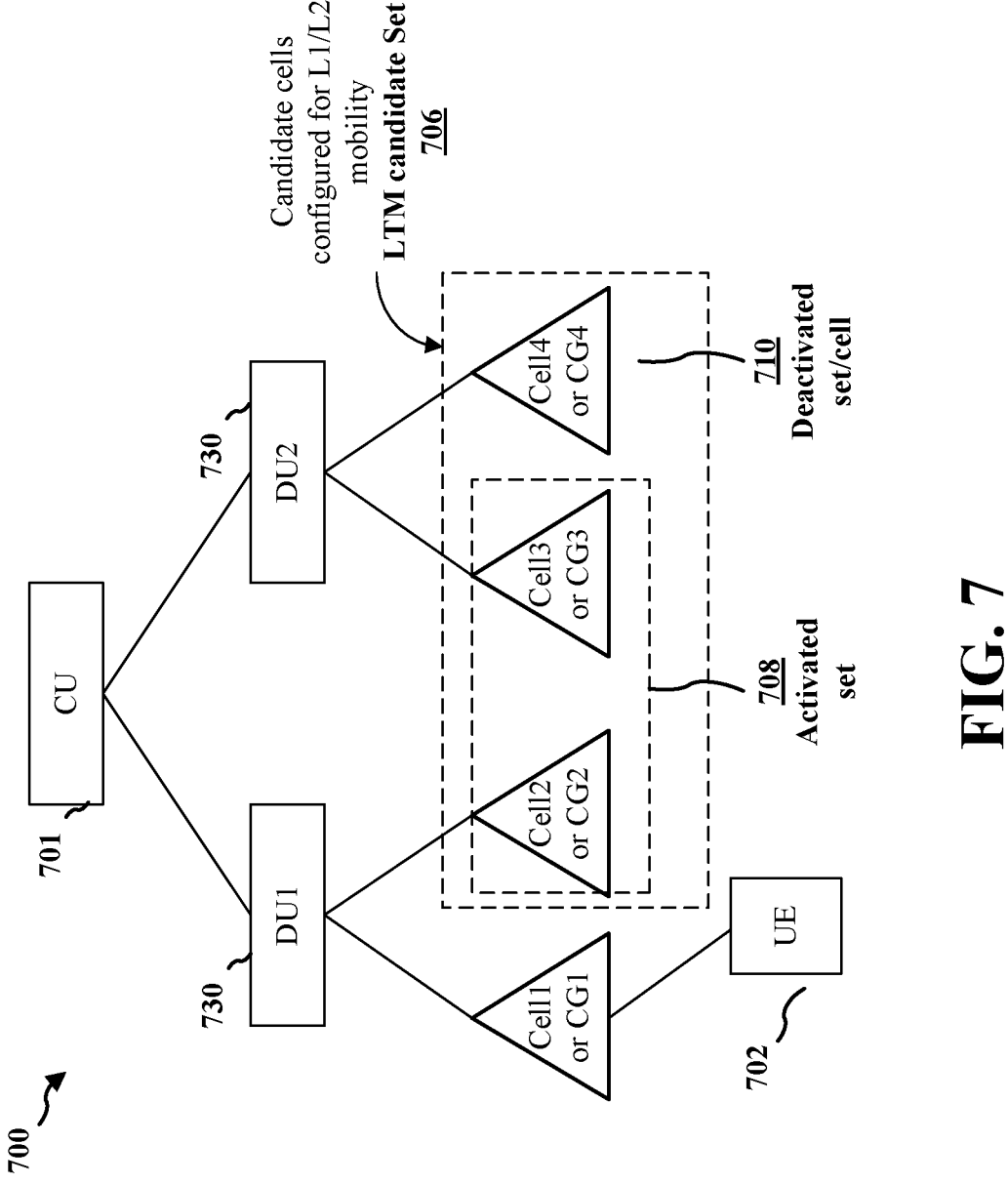
FIG. 7 is a diagram illustrating a configured set of cells for LTM, in accordance with various aspects of the present disclosure.

FIG. 7 is a diagram 700 illustrating an example of lower layer (e.g., L1 or L2) inter-cell mobility, which may be referred to as LTM. As shown in FIG. 7, a UE 702 may be served by a serving cell (Cell 1) or by a cell group (e.g., CG1). The UE 702 may be configured with a group of cells as candidate cells for L1/L2 mobility. The groups of cells may include, for example, Cell 2, Cell 3, and Cell 4, as shown in FIG. 7. Although the example is described in connection with individual cells, the aspects are similarly applicable for cells groups, e.g., and the Cell 2 may be a cell group 2, the Cell 3 may be a cell group 3, and/or the Cell 4 may be a cell group 4. The UE 702 may receive RRC configurations associated with Cell 2, Cell 3, and Cell 4. When the serving cell is changed to a target cell selected for switching, the UE 702 may apply the associated RRC configuration of the target cell. As illustrated in FIG. 7, a CU 701 (which may correspond to a component of a base station such as a gNB, and IAB-CU, etc.) may be associated with a first DU 730 (and other DUs). An L1/L2 triggered mobility (LTM) configured cell set 706 may be associated with the first DU 730 and may include an LTM activated cell set 708 and an LTM deactivated cell set 710. The LTM configured cell set 706 may also include one or more cells not in the current LTM activated cell set 708 or the current LTM deactivated cell set 710.

The UE 702 may perform measurements (e.g., L1 measurements) on the candidate cells, and the target cell may be selected based on these measurements. For example, the UE 702 may provide a measurement report and receive a cell switch command via L1/L2 signaling (e.g., MAC-CE or DCI). Thus, a set of candidate cells for LTM may be configured for the UE, and a subset of the candidate cells may be activated for the UE. The cells that are not activated, which in some aspects may be referred to as deactivated cells, are cells for which the UE received the LTM configuration, and for which the UE performs measurements but not used for the transfer of data or control until activated. As the UE moves, cells from the LTM configured cell set may be deactivated and activated by L1/L2 signaling based on signal quality (e.g., based on measurements), loading, or the like. Example measurements may include cell coverage measurements represented by RSRP, and quality represented by Radio Signal Received Quality (RSRQ), or other measurements that the UE performs on signals from the base station. In some aspects, the measurements may be L1 measurements such as one or more of an RSRP, an RSRQ, a received signal strength indicator (RSSI), or a signal to noise and interference ratio (SINR) measurement of various signals, such as an SSB, a PSS, an SSS, a broadcast channel (BCH), a DM-RS, CSI-RS, or the like. The mechanisms for lower layer inter-cell mobility (e.g., LTM) are applicable to the scenarios that involve cell groups. For example, the UE 702 may be served by a cell group (e.g., cell group 1 (CG1)) and be configured with a group of candidate cell groups for L1/L2 mobility (e.g., CG2, CG3, CG4). The UE 702 may switch the serving cell (or serving cell group) among the candidate cell groups based on the same principle described above.

The configuration and maintenance of multiple candidate cells may allow for a quicker application of configurations for the candidate cells, and the activated set of cells may provide for dynamic switching among the candidate serving cells (e.g., including an SpCell and SCell) based on L1 or L2 signaling.

Figure 8:
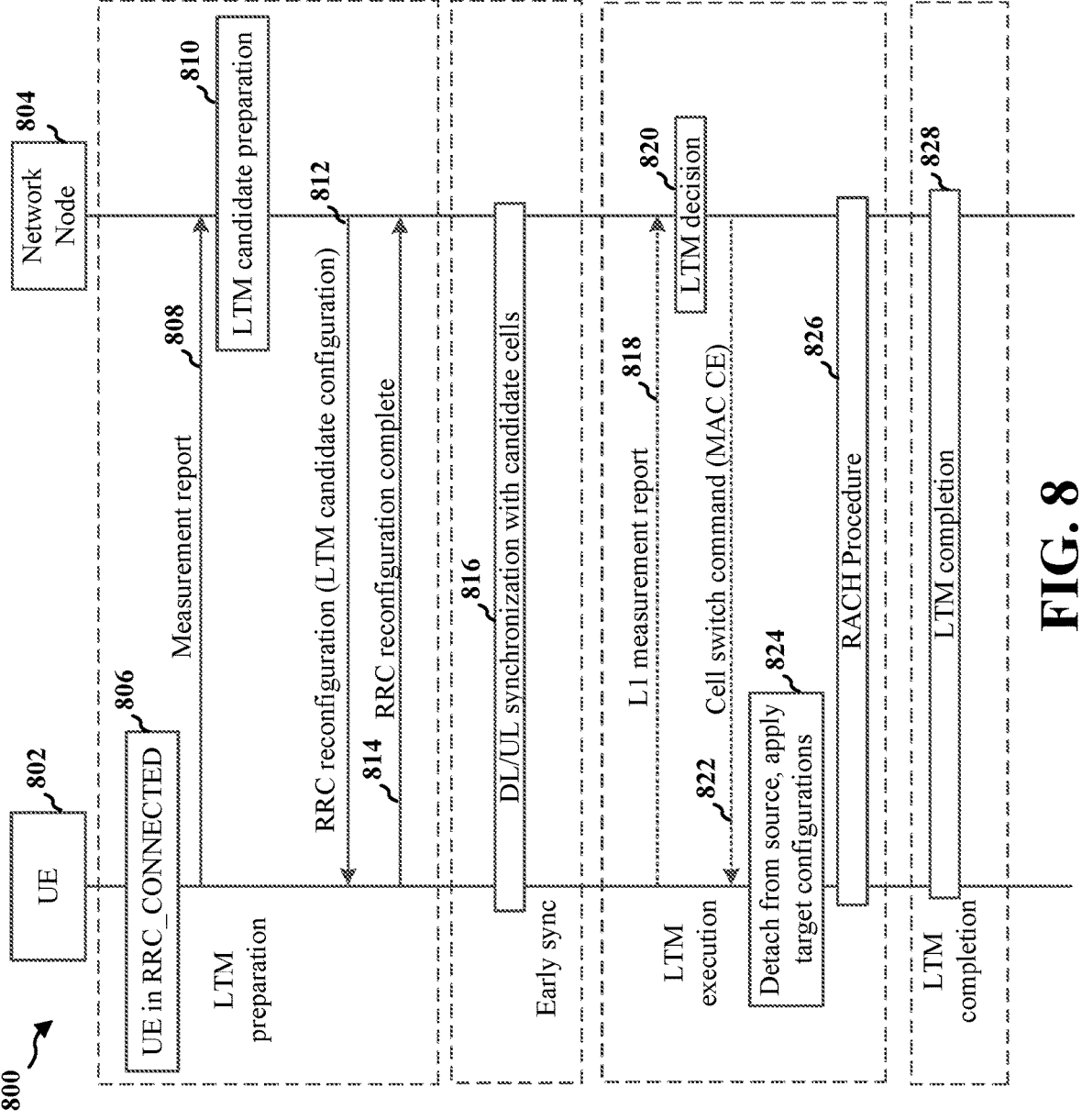
FIG. 8 is a diagram showing an example communication flow between a UE and a network for LTM, in accordance with various aspects of the present disclosure.

FIG. 8 illustrates an example communication flow 800 between a UE 802 and a network 804 for LTM. The UE 802 may be in an RRC connected mode with the network, e.g., as illustrated at 806. The UE 802 sends a measurement report message 808 to the network 804, and the network 804 decides to initiate LTM candidate preparation for the UE, at 810, e.g., based on the measurements provided by the UE.

The network 804 transmits an RRC reconfiguration message 812 to the UE 802 including the configuration of one or multiple LTM candidate target cells. The UE may respond with an RRC reconfiguration complete message 814. The UE 802 stores the configuration of the LTM candidate target cell(s). The UE 802 may perform downlink synchronization and timing advance (TA) acquisition with the candidate target cell(s), at 816, before receiving a LTM cell switch command. By performing the synchronization and TA acquisition, the UE may then be ready to perform an LTM cell switch. The UE 802 performs L1 measurements on the configured LTM candidate target cell(s), and transmits lower-layer measurement reports 818 to the network 804. The network 804 decides, e.g., at 820, to execute an LTM cell switch to a target cell for the UE 802, and transmits a MAC-CE 822 triggering the LTM cell switch by including the candidate configuration index of the target cell. The UE 802 switches to the configuration of the LTM candidate target cell. For example, the UE 802 detaches from the source cell and applies the previously received target cell configurations, at 824. The UE performs a random access, e.g., RACH, procedure towards the target cell, at 826, e.g., if the TA is not available. As illustrated at 828, the UE 802 may indicate a successful completion of the LTM cell switch towards target cell. In some aspects, the candidate cells may include overlapping sets of cells. The network node, e.g., 804, may be a CU, a DU, or a base station, e.g., as illustrated in connection with any of the previous figures.

Figure 9:
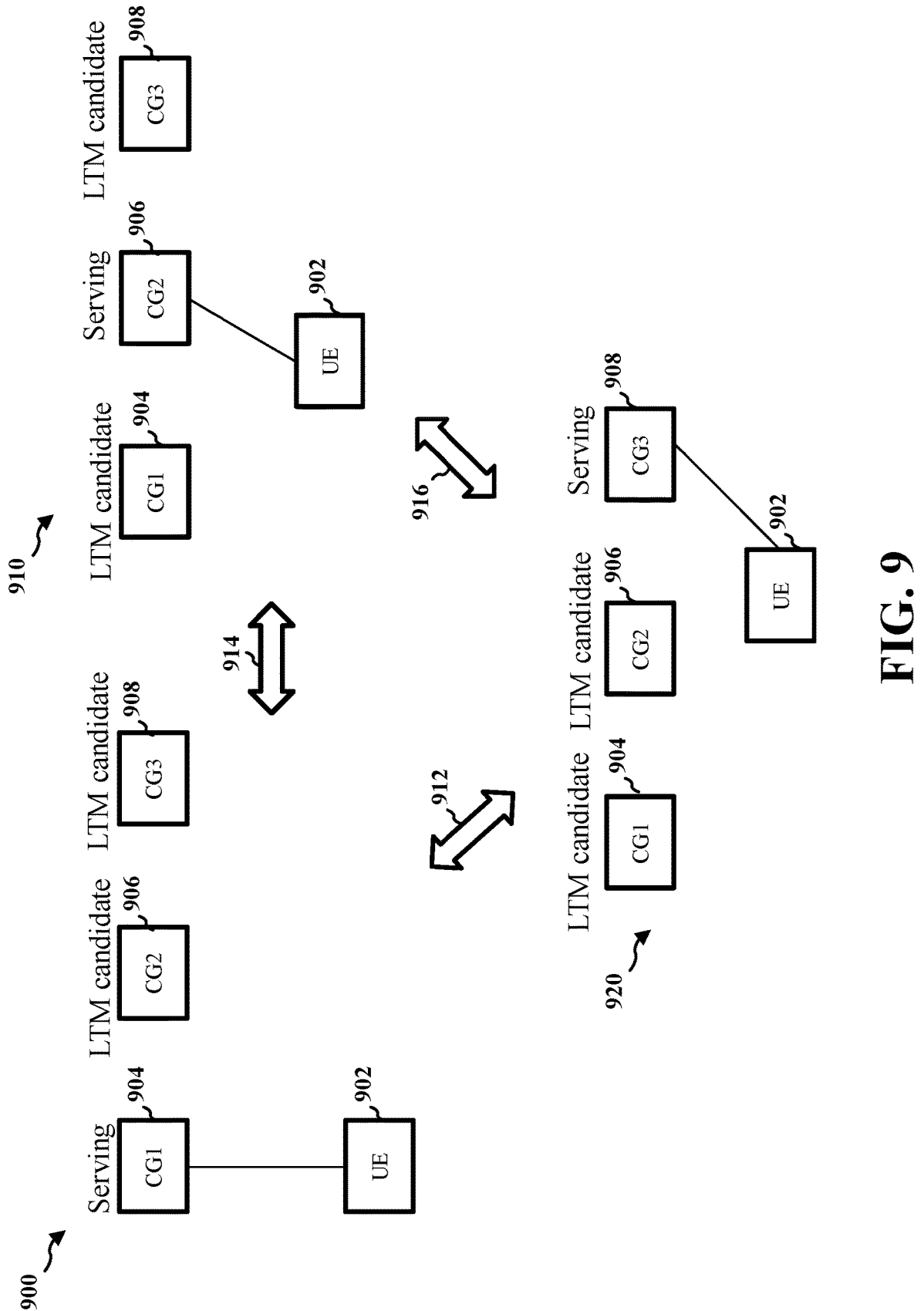
FIG. 9 is a diagram illustrating example aspects of subsequent LTM, in accordance with various aspects of the present disclosure.

FIG. 9 is a diagram showing a subsequent LTM that may include sequential L1/L2 cell changes, e.g., LTM changes, between candidate cells without RRC reconfiguration. In a first instance 900, a UE 902 may be served by cell (or cell group) 904 from a set of configured, e.g., and activated, LTM candidate cells (or cell groups) that includes candidate cells (or candidate cell groups) 906 and 908. At a second instance 910, the UE 902 is served by the cell (or cell group) 906, and cell 904 is a candidate cell for LTM. At a third instance 920, UE 902 is served by the cell (or cell group) 908, and cells 904 and 906 are candidate cells for LTM. In some aspects, the RRC configuration for LTM may provide the UE with enough information to have any of the candidate cells, e.g., 904, 906, and 908, as a serving cell. Cell groups may include overlapping cells. For example, a cell group (such as 904) may include one or more cells that are also in a second cell group (such as 906). In some aspects, a PCell in the first cell group may correspond to an SCell in the second group, and an SCell in the first group may correspond to an SCell in the second group. As illustrated by the arrows 912, 914, and 916, the UE may make various changes between the serving cell from the candidate cells or cell groups, e.g., without an RRC reconfiguration.

RRC integrity protection may be provided by a packet data convergence protocol (PDCP) layer between a UE and a base station, e.g., such as the UE 802 and the network 804 in FIG. 8. The layers below the PDCP layer may not be integrity protected. Replay protection may be activated when integrity protection is activated and may help the receiver to accept each incoming PDCP count value a single time using the same access stratum (AS) security context. As an example, a 32 bit PDCP count may be input to an algorithm along with a security key, such as a 128 bit NR integrity algorithm (NIA) that generates a message authentication code-integrity (MAC-I) for a PDCP protocol data unit (PDU) to provide integrity protection. The 32 bit PDCP count may be input to a 128 bit NR encryption algorithm (NEA) along with a security key, e.g., as an example, which ciphers a PDCP PDU. As an example, a first message may be based on a first PDCP count and include a corresponding key generated based on the PDCP count. A second message may be based on a second PDCP count, e.g., an incremented PDCP count that may comprise at least in part a PDCP sequence number (PDCP SN), and may include a second corresponding key that is generated based on the second, incremented PDCP count. The RRC integrity checks may be performed at the network and the UE, e.g., as an example at the ME and the gNB. If an integrity check is failed, e.g., if there is a faulty or missing MAC-I that is detected after the start of the integrity protection, the corresponding message may be discarded, and a recovery procedure may be triggered. The RRC confidentiality protection is provided by the PDCP layer between the UE and the network.

A receiver may perform PDCP reordering. As an example, if the UE is the receiver, the UE may order the received messages based on PDCP count. As a PDCP count is only used for a single message, the UE is able to determine the order for the message. The UE may use a timer, which may be configured by upper layers, as the UE attempts to reorder the received information. The timer may relate to the detection of loss of PDCP data protocol data units (PDUs). If a reodering timer, e.g., t-Reordering, the UE may refrain from starting an additional timer so that a single t-Reordering timer is running per receiving PDCP entity at a given time. When the timer expires, the receiving PDCP entity delivers the messages to an upper layer in ascending order of the associated PDCP count. The PDCP entity may perform header decompression, e.g., if not already decompressed. The PDCP entity may provide, in the ascending order, each stored PDCP signal radio bearer (SDU) with an associated count value less than a state variable (e.g., RX_REORD) that indicates a count value following a PDCP data PDU that triggered a reordering timer. Then, the UE may provide in ascending order, each PDCP SDU having consecutively associated count values starting from the state variable, e.g., RX_REORD. In some aspects, a default reordering timer value for SRBs may correspond to infinity or non-ending. An SRB may include control signaling, where a PDU carries data. With the reodering timer set to infinity for SRBs, the receiving PDCP entity does not skip a missed PDCP sequence number. If an RRC message, for example, is missing and not received, the gap in the PDCP count creates a hole that remains until the receiver determines a radio link failure (RLF) and initiates an RLF recovery or reestablishment procedure.

Figure 10:
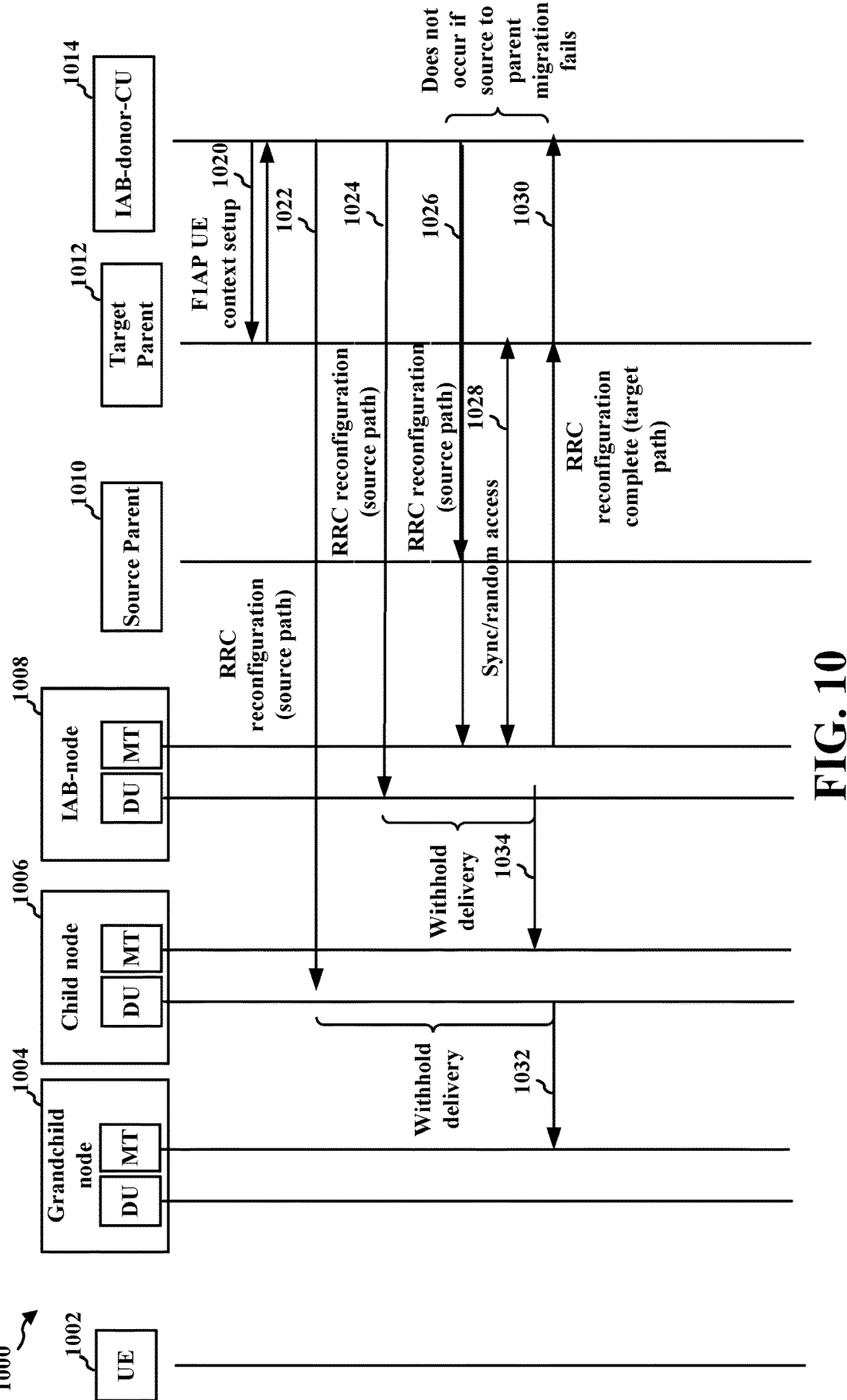
FIG. 10 illustrates an example of RRC reconfiguration in connection with LTM, in accordance with various aspects of the present disclosure.
Figure 11:
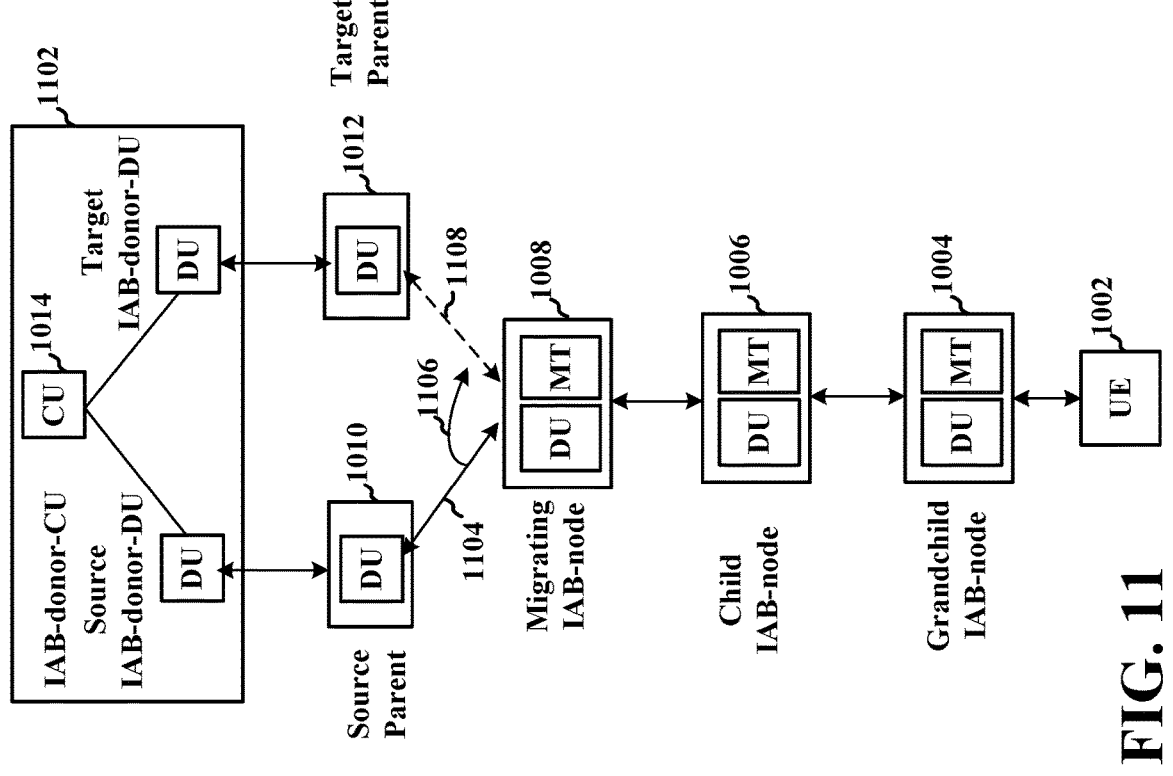
FIG. 11 is a diagram showing an example communication flow between a UE and a network that includes RRC reconfiguration and LTM, in accordance with various aspects of the present disclosure.

FIG. 10 illustrates an example communication flow 1000 including RRC reconfiguration for a UE 1002 with a change in a source path. As illustrated, the UE is initially served by an IAB-CU (e.g., 1014) via a source parent (e.g., DU 1010), an IAB node 1008, a child node 1006 of the IAB node 1008, and a grandchild node 1004 of the IAB node 1008. FIG. 11 is a diagram 1100 showing the path between the UE 1002 and the CU 1014 at the IAB donor 1102. As shown at 1104, the path between the UE 1002 and the CU 1014 initially has DU 1010 as a source parent. As described in connection with FIGS. 7-9, the UE 1002 may receive an LTM indication to switch, e.g., as shown at 1106, to DU 1012 as a target parent in the path between the CU 1014 and the UE 1002. After the LTM change, the UE 1002 will have a path with a connection to the DU 1012, as shown at 1108. The IAB node 1008 is referred to in FIG. 11 as a migrating IAB node, e.g., because it is the IAB node for which the change in a serving DU is being made. FIG. 11 illustrates that the change in DU can occur for an IAB node in a path between a UE and a CU. The number of IAB nodes between the UE and the IAB donor 1102 may include any number of IAB nodes, and is not limited to an IAB node 1008, child IAB node 1006, and grandchild IAB node 1004. For example, a UE may be directly connected to the IAB node 1008 or the child node 1006, e.g., as described in connection with FIGS. 4-6.

FIG. 10 shows that the CU 1014 and the target parent, e.g., 1012, may exchange UE context setup information 1020 over an F1AP interface, such as shown in FIG. 6 between a CU and IAB node. At 1022 and 1024, and 1026, FIG. 10 shows that an RRC message is sent to the descendent IAB nodes via a source path based on migration of an upstream IAB node. If the upstream IAB node fails to migrate, the RRC message to the descendent IAB nodes carries the wrong configuration. In that example, the reconfiguration at 1026, the synchronization and random access with the target parent, at 1028, and the RRC complete message 1030 do not occur. In some aspects, delivery may be withheld, e.g., as shown at 1032 and 1034. In other aspects, the RRC messages may be delivered with the wrong configuration to a descendent IAB-MT, because the RRC message carries IP address configuration information, which can be later modified.

Figure 12:
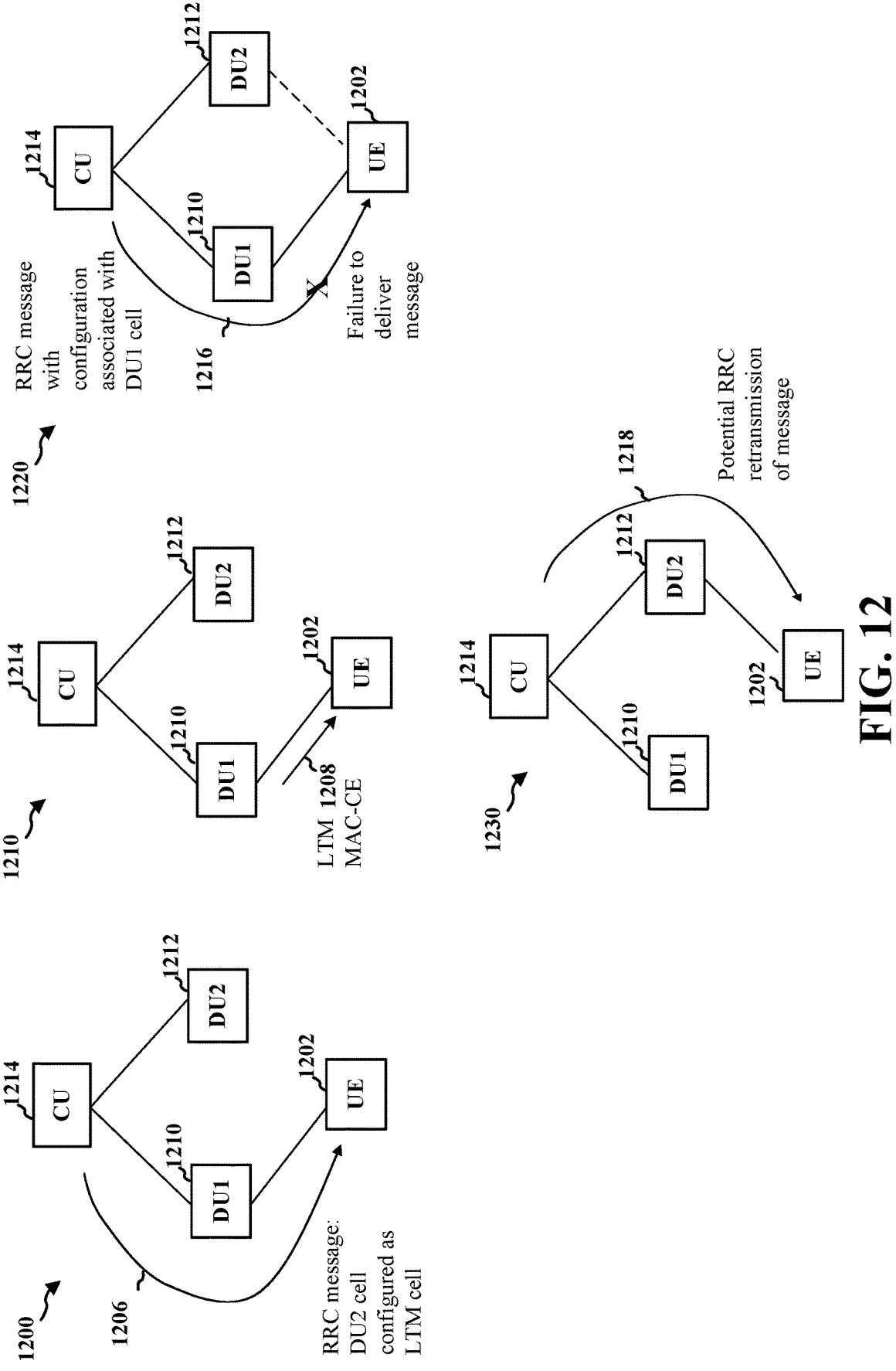
FIG. 12 is a diagram showing an example of an RRC configuration following an LTM change, in accordance with various aspects of the present disclosure.

FIG. 12 is a diagram showing LTM that includes a change in a DU serving a UE 1202 and RRC messaging from a CU 1214 to the UE associated with a prior serving DU. At a first instance 1200, the UE 1202 communicates with the CU 1214 via DU1 1210, e.g., DU1 is serves the UE or is in a path between the CU 1214 and the UE 1202. As illustrated at 1206, the CU 1214 may configure the UE with an LTM configuration (e.g., an inter-DU LTM configuration) that includes a second DU, e.g., DU2 1212 as a candidate cell for LTM. At a second instance 1210, the DU1 1210 may send an indication 1208 to the UE 1202 to perform an LTM change to being served by the DU2 1212 without the CU 1214 being aware of the change. The indication may be comprised, e.g., in an LTM MAC-CE. At a third instance 1220, the UE 1202 executes the LTM to DU2 1212 and transitions to a connection with DU2 1212. If the CU 1214 sends an RRC message 1216 with an RRC configuration associated with the DU1 1210 cell, the DU1 does not deliver the message to the UE, as the UE detaches from the source, e.g., as described in connection with 824 in FIG. 8, for the LTM. The RRC message 1216 uses a PDCP SN based on the PDCP count, as described above for RRC integrity protection. As illustrated at 1230, the CU 1214 may potentially provide a retransmission 1218 of the RRC message to the DU2 1212 for transmission to the UE 1202. The RRC configuration is associated with a prior serving DU, e.g., DU1 1201, and can be considered outdated because the UE is currently served by the DU2 1212. However, if the UE does not receive the RRC message, the UE has a gap in the PDCP count for PDCP reordering. As a PDCP count is used a single time, the following PDCP messages will use a higher count. If the UE does not receive the RRC message, the UE may continue to wait to receive the missing PDCP SN until the UE determines an RLF, e.g., if PDCP is not re-established following the LTM. As discussed above, the reordering timer, e.g., t-Reodering, may correspond to infinity. The UE waiting in response to the PDCP SN gap and the following RLF procedure causes an added delay that can reduce the time saving provided by LTM in comparison to an L3 cell change. Aspects presented herein provide enable the CU to avoid sending an RRC configuration to the UE for a prior serving DU and/or enable the UE to handle the RRC configuration and/or PDCP SN gap following an inter-DU LTM. The aspects presented herein help the UE to achieve the time savings through LTM by enabling the ongoing communication between the CU and the UE following an LTM.

Figure 13:
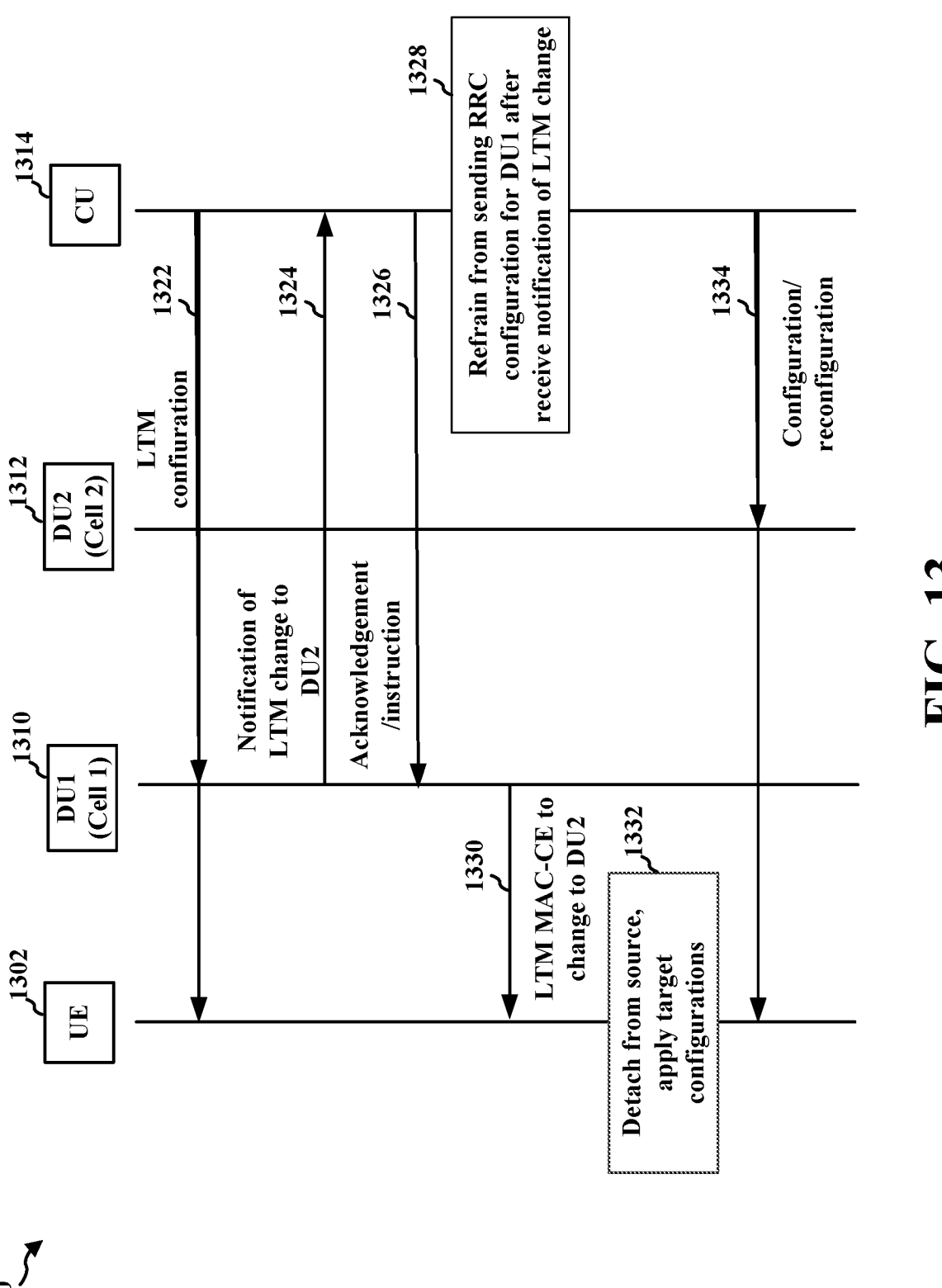
FIG. 13 illustrates an example communication flow, in accordance with various aspects of the present disclosure.

In some aspects, a DU may inform a CU prior to sending an LTM MAC-CE to a UE. The notification may include a request for the LTM and/or may inform the CU that the LTM change will occur. The DU may be for a cell or cell group serving the UE. FIG. 13 illustrates an example communication flow 1300 showing an LTM change for a UE 1302 in which the DU1 1310 (e.g., for a first cell or first cell group serving the UE) informs the CU 1314 prior to sending the LTM MAC-CE to the UE 1302. As illustrated at 1322, the CU may provide a configuration, e.g., for LTM and/or associated with DU1 1310 (or first cell or first cell group), to the UE via the DU1. At 1324, the DU1 1310 may send information to the CU 1314 about an LTM change for the UE to DU2 1312 (e.g., a change to a second cell or a second cell group served by the DU2). The change may be based on one or more measurements provided by the UE, e.g., as described in connection with FIGS. 7-9. In some aspects, the DU1 1310 may wait for a reply 1326 from the CU 1314 before sending the LTM MAC-CE 1330 to the UE informing the UE 1302 to change to being served by the DU2 1312. In some aspects, the reply 1326 may include an acknowledgement of the information from the DU1 informing the CU that the DU1 will send the LTM MAC-CE 1330. In some aspects, the notification to the CU at 1324 may include a request, and the reply 1326 may include instructions in response to the reply for the DU1 1310 to send the LTM MAC-CE 1330 to the UE 1302. In some aspects, the DU1 1310 may send the LTM MAC-CE 1330 without waiting for an acknowledgement or reply from the CU 1314. As illustrated at 1328, the CU 1314 may refrain from, skip, or avoid sending an RRC configuration to the UE associated with the DU1 1310 after receiving the notification of the LTM change from the DU1. This helps the CU to avoid the potential problem described in connection with FIG. 12. In response to the LTM MAC-CE 1330, at 1332, the UE 1302 executes the LTM change to DU2 1312, e.g., detaches from the DU1 1310 and attaches to the DU2 1312. As illustrated at 1334, the CU 1314 may send an RRC configuration message to the UE 1302 via the DU2 1312. The RRC configuration message may be associated with the DU2, for example, as the CU is aware of the change for the UE to a path via DU2. For example, an access stratum message may be sent to the CU after the LTM execution by the UE to the target cell. In one example, the DU1 and the DU2 may be comprised in a same DU, and the change from DU1 to DU2 may represent a change from a first cell to a second cell. For example, LTM could be intra-DU or inter-DU. If intra-DU LTM occurs, the serving cells of the UE would change, though they are still served by the same DU. If the configuration refers to an old serving cell, same issue occurs.

Figure 14:
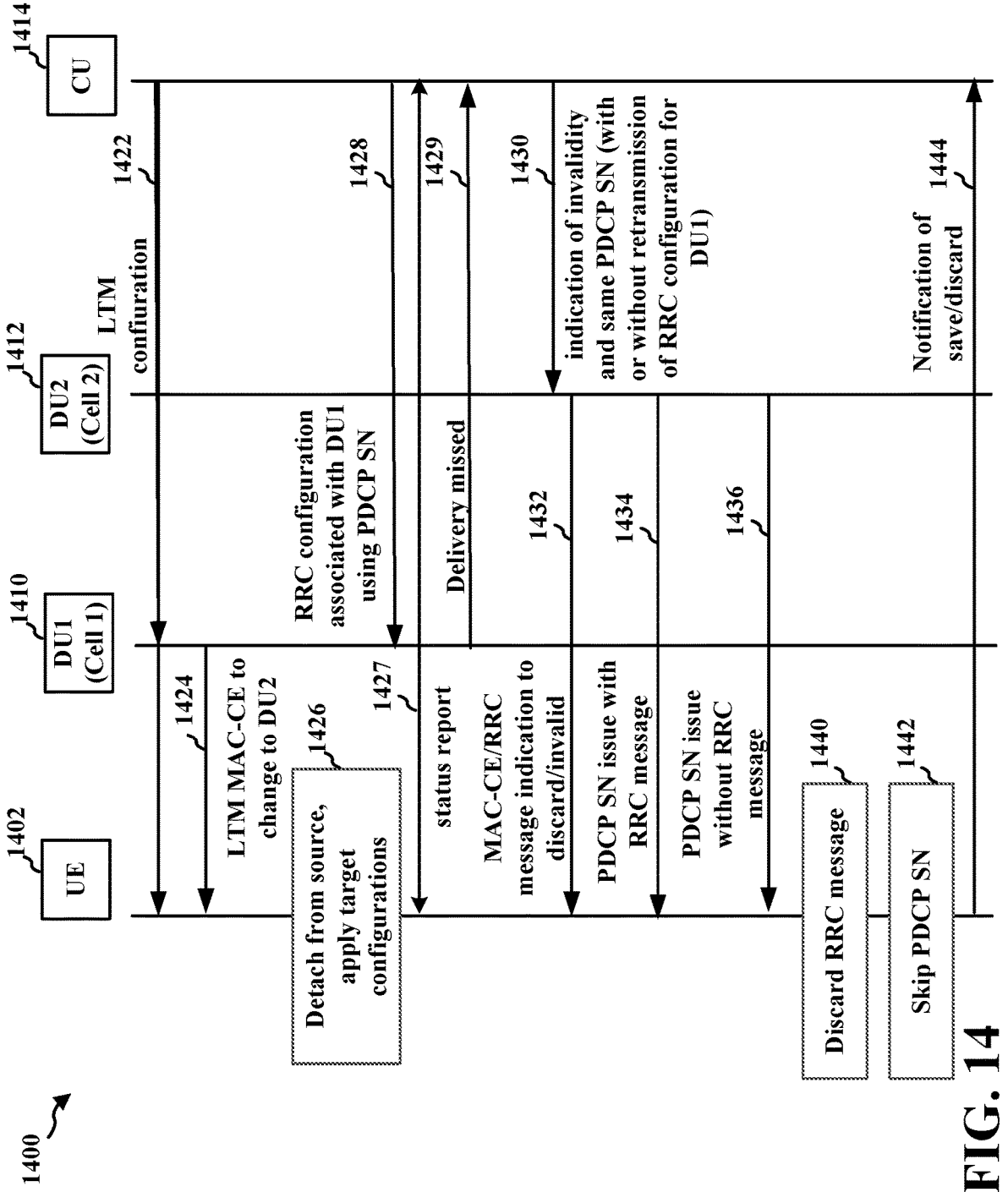
FIG. 14 illustrates an example communication flow, in accordance with various aspects of the present disclosure.

In some aspects, the CU may send the RRC message to the DU2 with an indication about the message's invalidity. In some aspects, the CU may send an indication of invalidity of an RRC message to the DU2 associated with a PDCP SN and an SRB. The indication may or may not carry the RRC message or may be sent with or without the actual RRC message. FIG. 14 illustrates a communication flow 1400 in which a CU 1414 sends an RRC message with a configuration for a prior serving DU. As illustrated at 1422, the CU 1414 may provide a configuration, e.g., for LTM and/or associated with DU1 1410 (e.g., DU1 serving a first cell or first cell group serving the UE), to the UE 1402 via the DU1 1410. The DU1 1410 sends the LTM MAC-CE 1424 to the UE 1402 to indicate an LTM change to DU2 (e.g., a change to a second cell or second cell group served by DU2) for the UE. The change may be based on one or more measurements provided by the UE, e.g., as described in connection with FIGS. 7-9. The CU 1414 is not aware of the change to DU2 for the UE. In response to the LTM MAC-CE 1424, at 1426, the UE 1402 executes the LTM change to DU2 1412, e.g., detaches from the DU1 1410 and attaches to the DU2 1412. At 1428, the CU 1414 may send an RRC reconfiguration 1428 for DU1 1410 to the UE 1402 via DU1, which is not delivered because the UE has executed LTM to the DU2 1412, e.g., as shown at 1220 in FIG. 12. The RRC message includes a PDCP SN based on the PDCP count. The UE and the network may exchange status reports 1427 (e.g. RLC status reports or PDCP status reports) that enable the CU to determine that the RRC message delivery via the DU1 was missed. The status reports may terminate on the network side at the DU or at the CU, and the exchange may occur before or after the LTM change. In some aspects, the DU1 may inform the CU, at 1429, that an RRC message delivery, or a full message delivery for the UE was missed, e.g., was not provided to the UE. At 1430, the CU 1414 may send an indication to the DU2 1412 that the PDCP is associated with an invalid RRC message. The indication may include the RRC message or may be provided without the RRC message. The indication may enable the DU2 to inform the UE in order to avoid or address a PDCP SN gap at the UE due to the missed message that was sent to the DU1 1410, at 1428. The CU 1414 may indicate, e.g., at 1430, that the RRC message is invalid. The CU may notify the DU in any of various ways. For example, the CU may indicate that the RRC message is for a prior serving DU, is sent for PDCP reordering, is outdated or otherwise invalid. As an example, the CU 1414 may indicate that the RRC message is invalid. In some aspects, the CU may indicate a corresponding SRB for the invalid RRC message. The DU2 1412 may append a MAC-CE to the RRC message, at 1432, or to at least a portion of the RRC message, e.g., one or more segments of the RRC message, and transmit the message 1432 to the UE 1402. The UE may receive the indication of invalidity for the RRC message, and the UE may discard the message at 1440. In some aspects, the CU may indicate to the DU2 1412 that the RRC message is invalid, and the DU2 may transmit an indication of the issue for the PDCP SN (e.g., and associated SRB) to the UE, at 1434. As an example, the UE may receive an RRC configuration on SRB1 and another RRC configuration on SRB2. The DU2 1412 may inform the UE that the PDCP SN on SRB #1 is invalid so that the UE knows which to discard. The indication helps the UE to be aware of the issue and to avoid waiting for the PDCP SN for the corresponding PDCP count in PDCP reordering, and can help to avoid RLF. The DU2 1412 may further transmit the RRC message to the UE 1402, and the UE may discard the message at 1440. In some aspects, the DU2 1412 may transmit an indication of the issue for the PDCP SN at 1436, e.g., and may indicate the associated SRB, to the UE 1402 without sending the RRC message to the UE 1402. At 1442, the UE 1402 may skip the PDCP SN for PDCP reordering, and may similarly avoid RLF by not waiting to receive the message with the corresponding PDCP SN. In some aspects, the UE 1402 may receive a configuration indicating for the UE to apply 1440 and/or 1442 for a particular bearer from multiple SRBs or to apply 1440 and/or 1442 for each SRB configured for the UE 1402. The configuration may be indicated in 1422, as an example, and the UE may apply the configuration in performing 1440 or 1442. In some aspects, the UE may notify the network that the UE has discarded the RRC configuration, e.g., at 1444.

Figure 15:
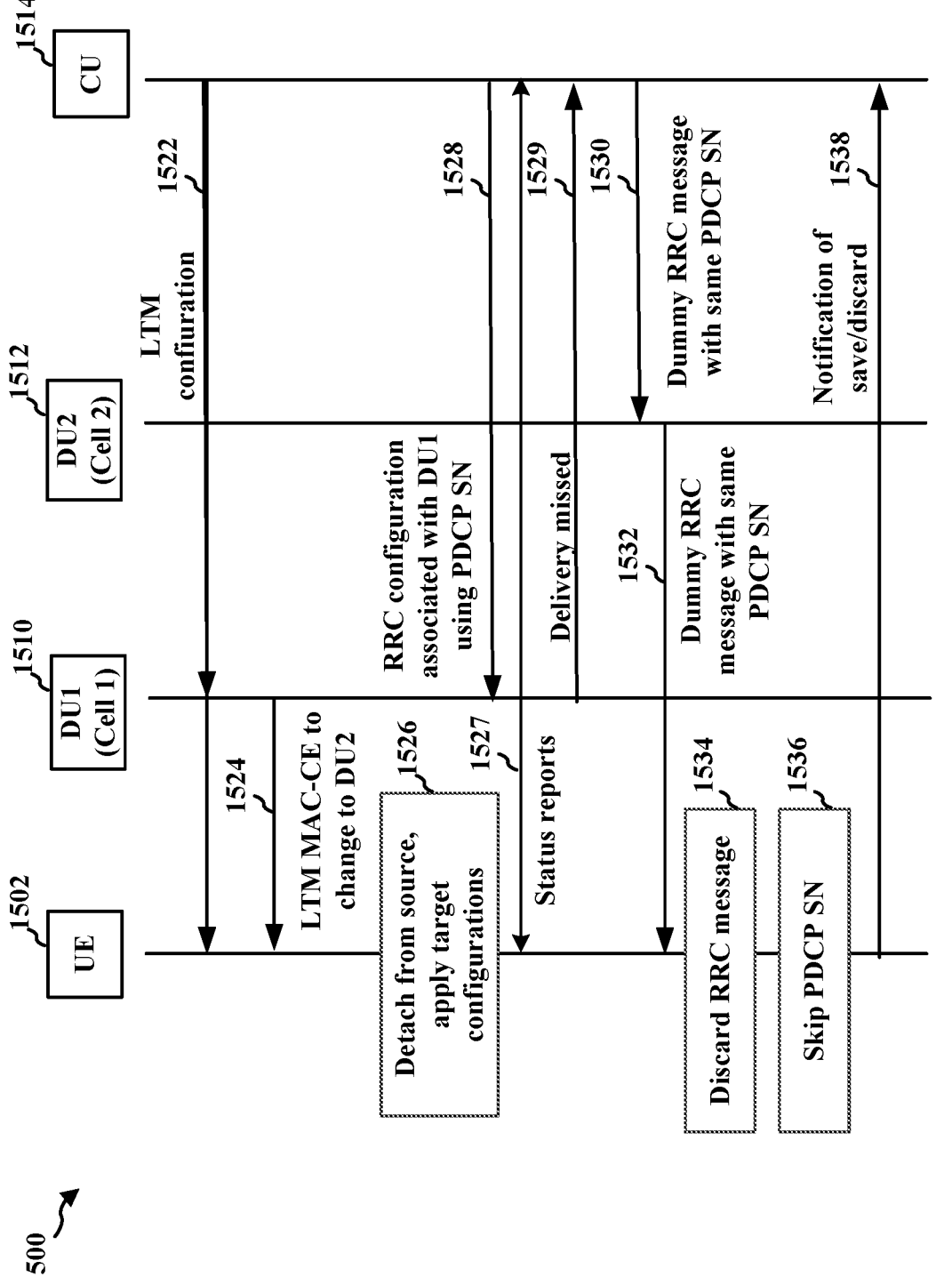
FIG. 15 illustrates an example communication flow, in accordance with various aspects of the present disclosure.

In some aspects, the CU may send an RRC message to the UE via the DU2, the RRC message indicating that the message is invalid. As an example, the CU may send a dummy RRC message to the UE using the same PDCP SN. As the message is a dummy message and not an actual RRC message, the same PDCP SN may be used. The dummy message may be security protected or may be in plain text. FIG. 15 illustrates a communication flow 1500 in which a CU 1514 sends an RRC message with a configuration for a prior serving DU. As illustrated at 1522, the CU 1514 may provide a configuration, e.g., for LTM and/or associated with DU1 1510 (e.g., for a first cell or first cell group served by DU1), to the UE 1502 via the DU1 1510. The DU1 1510 sends the LTM MAC-CE 1524 to the UE 1502 to indicate an LTM change to DU2 for the UE (e.g., a change to a second cell or second cell group served by DU2). The change may be based on one or more measurements provided by the UE, e.g., as described in connection with FIGS. 7-9. The CU 1514 is not aware of the change to DU2 for the UE. In response to the LTM MAC-CE 1524, at 1526, the UE 1502 executes the LTM change to DU2 1512, e.g., detaches from the DU1 1510 and attaches to the DU2 1512. At 1528, the CU 1514 may send an RRC reconfiguration 1528 for DU1 1510 to the UE 1502 via DU1, which is not delivered because the UE has executed LTM to the DU2 1512, e.g., as shown at 1220 in the example in FIG. 12. The RRC message includes a PDCP SN based on the PDCP count. The UE and the network may exchange status reports 1527 (e.g. RLC status reports or PDCP status reports) that enable the CU to determine that the RRC message delivery via the DU1 was missed. The status reports may terminate on the network side at the DU or at the CU, and the exchange may occur before or after the LTM change. In some aspects, the DU1 may inform the CU, at 1529, that an RRC message delivery, or a full message delivery for the UE was missed, e.g., was not provided to the UE. At 1530, the CU 1514 may send, e.g., transmit, a dummy RRC message to the DU2 1512 to be provided to the UE 1502, at 1532, in order to avoid or address a PDCP SN gap at the UE 1502 due to the missed message that was sent to the DU1 1510, at 1528. The use of the dummy RRC message by the CU 1514 indicates that the RRC message is invalid. The UE 1502 may discard the message at 1534. At 1536, the UE 1502 may skip the PDCP SN for PDCP reordering, and may similarly avoid RLF by not waiting to receive the message with the corresponding PDCP SN. In some aspects, the UE 1502 may receive a configuration indicating for the UE to apply 1534 and/or 1536 for a particular bearer from multiple SRBs or to apply 1524 and/or 1536 for each SRB configured for the UE 1502. The configuration may be indicated in 1522, as an example, and the UE may apply the configuration in performing 1534 or 1536. In some aspects, the UE may notify the network that the UE has discarded the RRC configuration or skipped the PDCP, e.g., at 1538.

Figure 16:
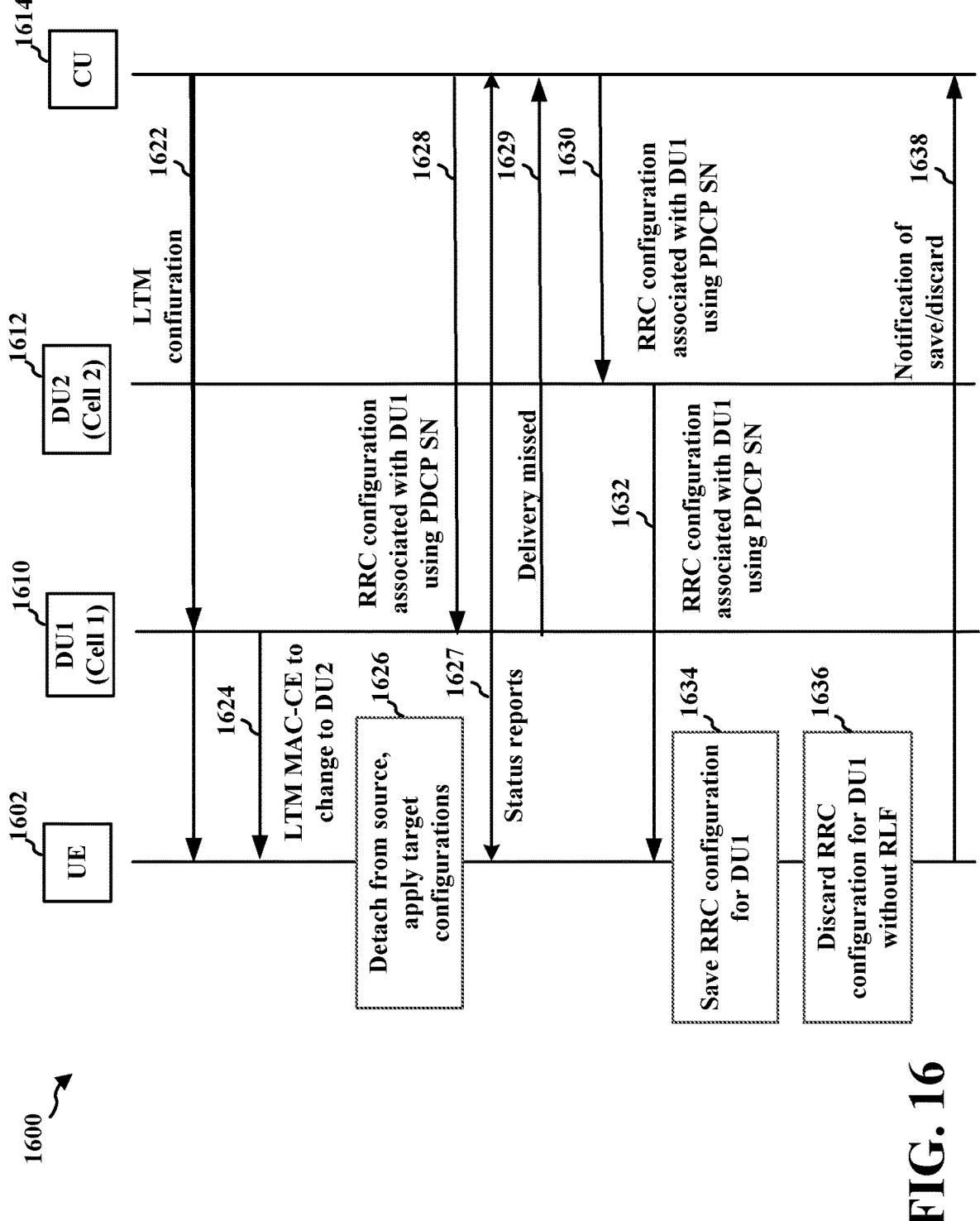
FIG. 16 illustrates an example communication flow, in accordance with various aspects of the present disclosure.

In some aspects, the CU may retransmit the RRC configuration for DU1 to the UE via the DU2, and the UE may use the message to update the DU1 associated LTM candidate configuration, e.g., if subsequent LTM to DU1 is supported. FIG. 16 illustrates a communication flow 1600 in which a CU 1614 sends an RRC message with a configuration for a prior serving DU. As illustrated at 1622, the CU 1614 may provide a configuration, e.g., for LTM and/or associated with DU1 1610 (e.g., for a first cell or first cell group served by DU1), to the UE 1602 via the DU1 1610. The DU1 1610 sends the LTM MAC-CE 1624 to the UE 1602 to indicate an LTM change to DU2 for the UE. The change may be based on one or more measurements provided by the UE, e.g., as described in connection with FIGS. 7-9. The CU 1614 is not aware of the change to DU2 for the UE (e.g., a change to a second cell or a second cell group served by DU2). In response to the LTM MAC-CE 1624, at 1626, the UE 1602 executes the LTM change to DU2 1612, e.g., detaches from the DU1 1610 and attaches to the DU2 1612. At 1628, the CU 1614 may send an RRC reconfiguration 1628 for DU1 1610 to the UE 1602 via DU1, which is not delivered because the UE has executed LTM to the DU2 1612, e.g., as shown at 1220 in the example in FIG. 12. The RRC message includes a PDCP SN based on the PDCP count. The UE and the network may exchange status reports 1627 (e.g. RLC status reports or PDCP status reports) that enable the CU to determine that the RRC message delivery via the DU1 was missed. As an example, a PDCP status report may include a PDCP control PDU. The status reports may terminate on the network side at the DU or at the CU, and the exchange may occur before or after the LTM change. In some aspects, the DU1 may inform the CU, at 1629, that an RRC message delivery, or a full message delivery for the UE was missed, e.g., was not provided to the UE. At 1630, the CU 1614 may send the same RRC message to the DU2 1612 to be provided to the UE 1602, at 1632. The messages 1630 and 1632 may include the RRC configuration associated with the DU1 1410 and the same PDCP SN from the message sent at 1628. As illustrated at 1634, the UE may update a configuration for the DU1 (e.g., the LTM candidate configuration, the prior serving cell configuration, or the prior serving cell group configuration) for DU1 based on the RRC message. Then, if the UE later performs LTM to change back to the DU1 612, the UE can apply the RRC configuration received at 1632. However, the UE is able to identify that the RRC configuration is associated with the DU1 1610 so that the UE 1602 does not apply the RRC configuration to the communication with the DU2 1612. In some aspects, the message 1630 and/or 1632 may include an indication that the RRC configuration is associated with the DU1. In some aspects, the UE 1602 may discard the message at 1636 without RLF based on determining that the RRC configuration is for DU1 1610. For example, the UE 1602 may determine that the message 1632 is outdated based on content of the message (e.g., referring to configuration associated with prior serving cell DU1), exchange of an RLC or PDCP status reports with the network, and/or the reception of the RRC message following an LTM execution. In some aspects, the UE may discard the message, e.g., apply this behavior, for a specific radio bearer. In some aspects, the UE 1602 may receive a configuration indicating for the UE to apply 1634 and/or 1636 for a particular bearer from multiple SRBs or to apply 1624 and/or 1636 for each SRB configured for the UE 1602. The configuration may be indicated in 1622, as an example, and the UE may apply the configuration in performing 1634 or 1636. In some aspects, the UE may notify the network that the UE has discarded the RRC configuration, e.g., at 1638.

Figure 17:
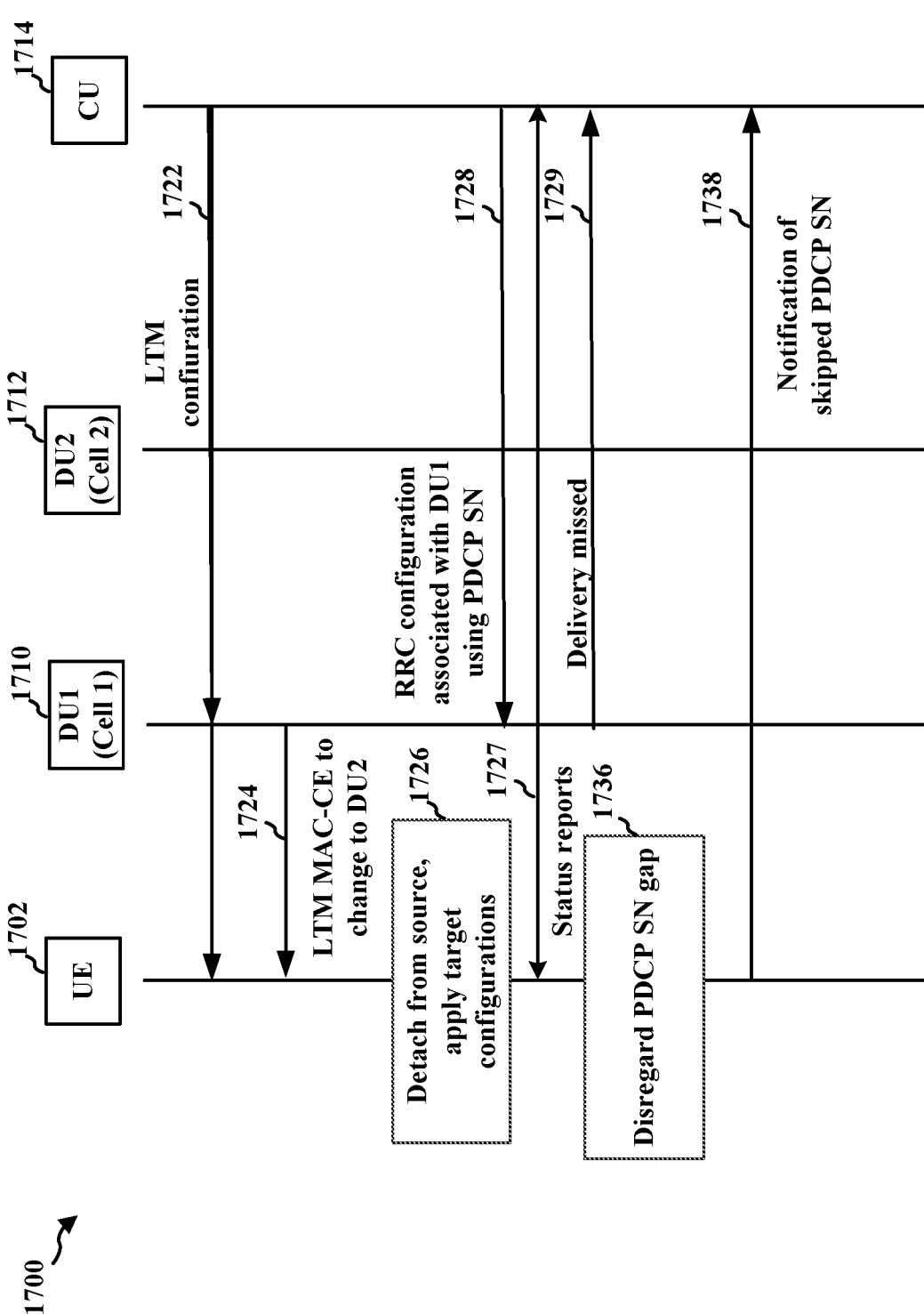
FIG. 17 illustrates an example communication flow, in accordance with various aspects of the present disclosure.

In some aspects, the RRC message with the RRC configuration for DU1 may not be delivered to the UE, and the UE may determine to disregard the PDCP SN gap based on having just perform LTM. FIG. 17 illustrates a communication flow 1700 in which a CU 1714 sends an RRC message with a configuration for a prior serving DU. As illustrated at 1722, the CU 1714 may provide a configuration, e.g., for LTM and/or associated with DU1 1710 (e.g., for a first cell or first cell group served by DU1), to the UE 1702 via the DU1 1710. The DU1 1710 sends the LTM MAC-CE 1724 to the UE 1702 to indicate an LTM change to DU2 for the UE (e.g., for a change to a second cell or a second cell group served by DU2). The change may be based on one or more measurements provided by the UE, e.g., as described in connection with FIGS. 7-9. The CU 1714 is not aware of the change to DU2 for the UE. In response to the LTM MAC-CE 1724, at 1726, the UE 1702 executes the LTM change to DU2 1712, e.g., detaches from the DU1 1710 and attaches to the DU2 1712. At 1728, the CU 1714 may send an RRC reconfiguration 1728 for DU1 1710 to the UE 1702 via DU1, which is not delivered because the UE has executed LTM to the DU2 1712, e.g., as shown at 1220 in the example in FIG. 12. The RRC message includes a PDCP SN based on the PDCP count. Rather than sending the message to the DU2, e.g., as in FIGS. 14, 15, and 16, the CU 1614 may refrain from resending the RRC configuration for the DU1. The UE may determine, or identify, the gap in PDCP SNs for PDCP reordering. The UE may determine that this gap follows the LTM execution, at 1726, and may disregard the gap by forwarding the other PDCP PDUs to upper layer without waiting for the missing PDCP SN, at 1736. This enables the UE to avoid RLF. In some aspects, the UE 1702 may notify the network that the UE has skipped the PDCP SN, at 1738. In some aspects, the UE 1702 may receive a configuration indicating for the UE to PDCP SN skipping following LTM, and the configuration may be for a particular bearer from multiple SRBs. The configuration may be indicated in 1722, as an example, and the UE 1702 may apply the configuration by sending PDCPs to an upper layer with a PDCP SN gap, at 1736. In some aspects, the configuration 1722 may provide one or more timers relating to PDCP reodering following an LTM. As an example, the configuration may provide a time period, or time value, following LTM and during which the UE may ignore PDCP SN gaps. In some aspects, the configuration may, additionally or alternatively, include a timer before which the UE defers ignoring PDCP SNs following LTM execution. In some aspects, the configuration may, additionally or alternatively, include a second reordering timer which the UE uses on the SRB following LTM execution, e.g., within a [configured] time interval following LTM execution. The UE may disregard the PDCP SN gap, at 1736, on the condition of prior LTM change or based on a condition of a prior LTM change within a period of time, which may be configured, defined in a rule or standard, or determined by the UE. The action of the UE at 1736 may be a default behavior for a particular radio bearer (e.g., SRB1 or a different radio bearer) following LTM execution, in some aspects. The UE and the network may exchange status reports 1727 (e.g. RLC status reports or PDCP status reports) that enable the CU to determine that the RRC message delivery via the DU1 was missed. The status reports may terminate on the network side at the DU or at the CU, and the exchange may occur before or after the LTM change. In some aspects, the DU1 may inform the CU, at 1729, that an RRC message delivery, or a full message delivery for the UE was missed, e.g., was not provided to the UE.

Figure 18B:
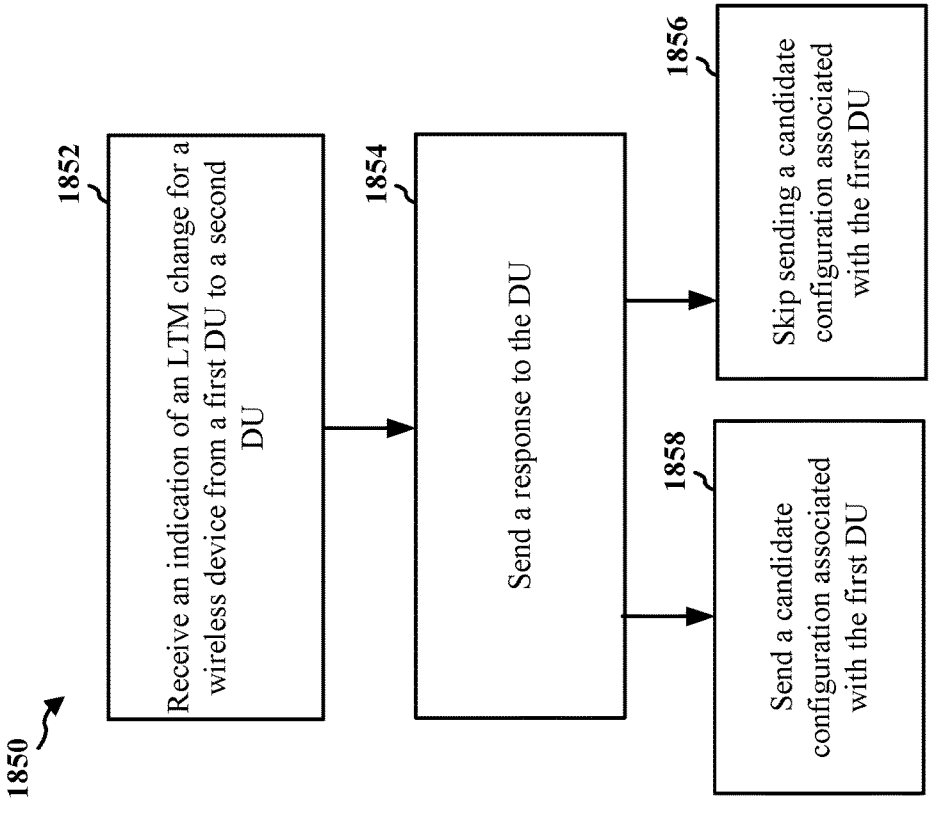
FIG. 18B is a flowchart of a method of wireless communication at a CU, in accordance with various aspects of the present disclosure.
Figure 18A:
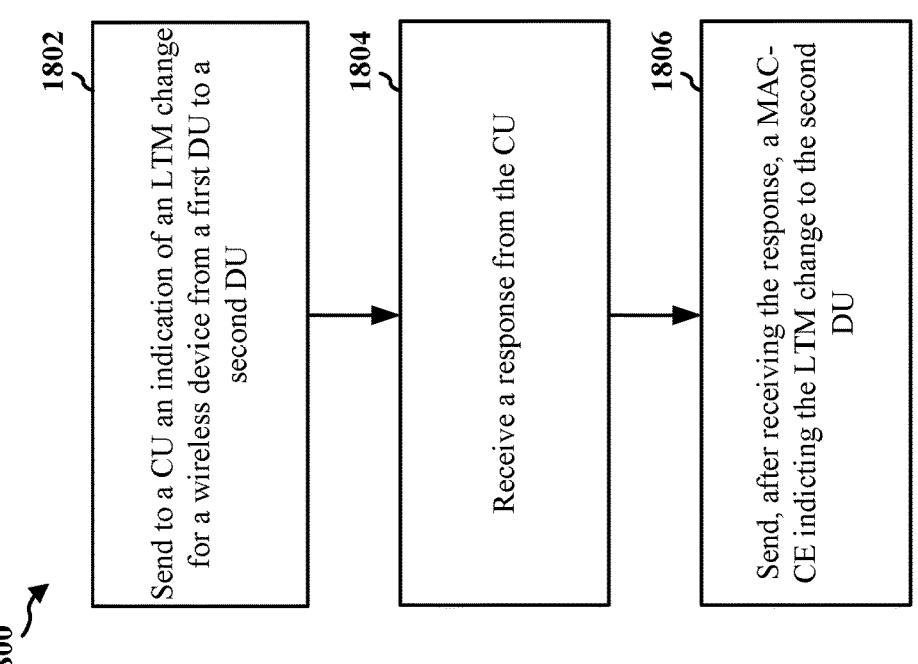
FIG. 18A is a flowchart of a method of wireless communication at a DU, in accordance with various aspects of the present disclosure.

FIG. 18A is a flowchart 1800 of a method of wireless communication. The method may be performed by a base station or a component of a base station in aggregation or a disaggregated component of a base station (e.g., the base station 102, 310; the network entity 2302). In some aspects, the method may be performed by a DU (e.g., DU1 1310). The method may enable the DU to help avoid a PDCP and RLF at a UE.

At 1802, the first DU sends to a CU an indication of an LTM change for a wireless device from the first DU to a second DU, e.g., from a first cell or cell group that is served by the first DU to a second cell or second cell group that is served by the second DU. FIG. 13 illustrates an example of DU1 1310 sending an indication to a CU 1314. The indication may be transmitted, e.g., from the first DU to the CU, which may be performed, e.g., by the LTM component 199 of the network entity 2302 in FIG. 23, for example. The wireless device may be a UE or a child device of the first DU. In some aspects, the DU may be a component of an IAB node, and the wireless device may be a child device of the IAB-DU.

At 1804, the DU receives a response from the CU. FIG. 13 includes an example of a CU sending a reply to the DU. The response may acknowledge the indication. The response may accept or reject the indicated LTM change. The reception of the response may be performed, e.g., by the LTM component 199 of the network entity 2302 in FIG. 23.

At 1806, the DU sends, after notifying the CU, a MAC-CE for the wireless device indicating the LTM change to the second DU. FIG. 13 illustrates an example of the DU1 sending the LTM MAC-CE to the UE after a reply from the CU. The MAC-CE be transmitted, e.g., from the first DU to the wireless device (e.g., UE), which may be performed, e.g., by the LTM component 199 of the network entity 2302 in FIG. 23, for example.

FIG. 18B is a flowchart 1850 of a method of wireless communication. The method may be performed by a base station or a component of a base station in aggregation or a disaggregated component of a base station (e.g., the base station 102, 310; the network entity 2302). In some aspects, the method may be performed by the CU 1314 of FIG. 13. The method may help a CU to avoid sending an outdated RRC configuration and to avoid PDCP gaps at the UE and RLF.

At 1852, the CU receives, from a DU, an indication of an upcoming LTM change for a wireless device from the first DU to a second DU, e.g., from a first cell or cell group that is served by the first DU to a second cell or second cell group that is served by the second DU. FIG. 13 illustrates an example of a CU 1314 receiving an indication from a DU 1310. The reception may be performed, e.g., by the LTM component 199 of the network entity 2302 in FIG. 23, for example. The wireless device may be a UE or a child device of the first DU. In some aspects, the CU may be an IAB-DU, the DU may be a component of an IAB node, and the wireless device may be a child device of the IAB-DU.

At 1854, the CU sends a response to the DU. The response may acknowledge the indication. The response may accept or reject the indicated LTM change. The transmission of the response may be performed, e.g., by the LTM component 199 of the network entity 2302 in FIG. 23.

As illustrated at 1856, the CU may skip sending a candidate configuration associated with the first DU for the wireless device after receiving the indication of the LTM change to the second DU if the response approves the LTM change. As illustrated at 1858, the CU may send the candidate configuration associated with the first DU if the response does not approve the LTM change. The skipping or the sending e.g., transmission or output for transmission, of the candidate configuration may be performed by the LTM component 199 of the network entity 2302 in FIG. 23.

FIG. 19A is a flowchart 1900 of a method of wireless communication. The method may be performed by a base station or a component of a base station in aggregation or a disaggregated component of a base station (e.g., the base station 102, 310; the network entity 2302). In some aspects, the method may be performed by a DU (e.g., DU2 1412). The method may enable the DU to help avoid a PDCP and RLF at a UE.

At 1902, the DU receives from a CU, a first indication of invalidity for an RRC message for a wireless device associated updating an LTM candidate configuration associated with a prior serving DU that previously served the wireless device. For example, FIG. 14 illustrates an example of a DU2 1412 that receives an indication 1430 from a CU 1414. The wireless device may be a UE or a child device of the first DU. In some aspects, the CU may be an IAB-CU, the DU may be a component of an IAB node, and the wireless device may be a child device of the IAB-DU. The reception may be performed, e.g., by the LTM component 199 of the network entity 2302 in FIG. 23. In some aspects, the DU may further receive the RRC message from the CU. In some aspects, the DU may receive the invalidity indication without receiving the RRC message.

At 1904, the DU sends, to the wireless device served by the DU, a second indication of invalidity associated with a packet data protocol convergence (PDCP) sequence number (SN) for the RRC message. FIG. 14 illustrates various examples of the DU2 1412 sending indications of invalidity, e.g., 1432, 1434, 1436, to the UE 1402. The indication may be performed as a transmission to the UE, as an example. The indication may be performed, e.g., by the LTM component 199 of the network entity 2302 in FIG. 23.

In some aspects, the DU may further forward the RRC message to the wireless device, wherein the indication of invalidity notifies the wireless device that PDCP SN is associated with the invalid RRC message. The forwarding may be performed, e.g., by the LTM component 199 of the network entity 2302 in FIG. 23. As an example, the DU may append a MAC-CE to the RRC message, or at least a portion of the RRC message, along with an indication of invalidity. In some aspects, the DU may indicate that the PDCP SN is associated with the invalid RRC message without forwarding the RRC message.

FIG. 19B is a flowchart 1950 of a method of wireless communication. The method may be performed by a base station or a component of a base station in aggregation or a disaggregated component of a base station (e.g., the base station 102, 310; the network entity 2302). In some aspects, the method may be performed by the CU 1414 of FIG. 14. The method may help a CU to avoid sending an outdated RRC configuration and to avoid PDCP gaps at the UE and RLF.

At 1952, the CU sends an RRC message for a wireless device updating an LTM candidate configuration associated with a first DU. FIG. 14 illustrates an example of a CU 1414 sending an RRC message, e.g., 1428, associated with the DU1 1410. The wireless device may be a UE or a child device of the first DU. In some aspects, the CU may be an IAB-CU, the DU may be a component of an IAB node, and the wireless device may be a child device of the IAB-DU.

Figure 23:
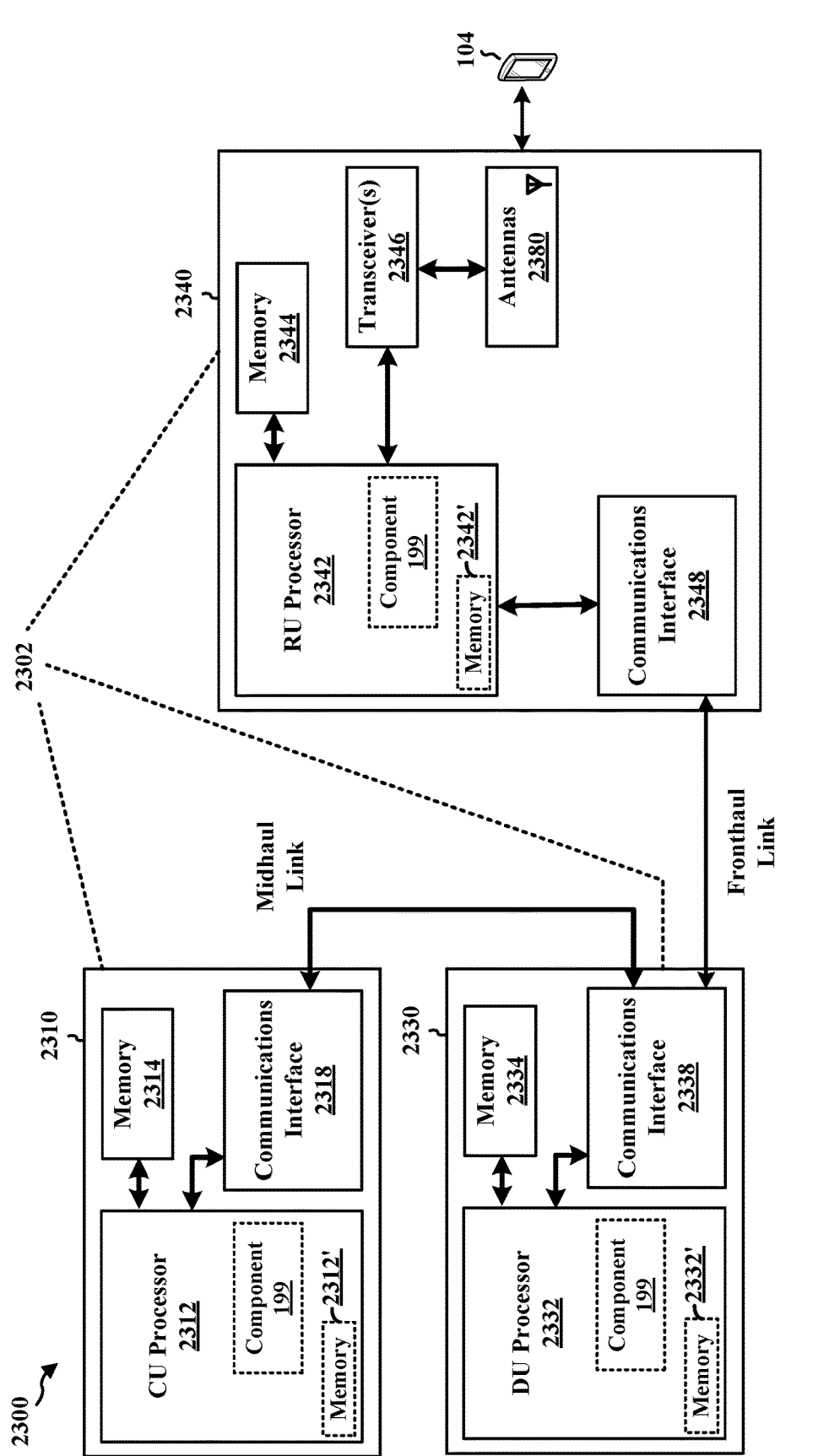
FIG. 23 is a diagram illustrating an example of a hardware implementation for an example network entity, in accordance with various aspects of the present disclosure.

The sending may be performed, e.g., by the LTM component 199 of the network entity 2302 in FIG. 23.

At 1954, the CU receives an unsuccessful delivery indication for the RRC message. The reception may be performed, e.g., by the LTM component 199 of the network entity 2302 in FIG. 23. In some aspects, the DU may receive a notification from the first DU that at least a part of a delivery of the RRC message for the UE was missed. In some aspects, the CU may receive a first status report (e.g., an RLC status report or a PDCP status report) from the wireless device that at least a part of the RRC message delivery was missed. In some aspects, the CU may provide a second report to the wireless device that the at least the part of the RRC message delivery was skipped. FIG. 14 illustrates examples of mechanisms by which the CU may identify that an RRC message was not delivered to a UE.

At 1956, the CU sends, to a second DU serving the UE, an indication of invalidity for the RRC message. In some aspects, the CU may further send the RRC message to the second DU. The indication of invalidity may indicate a corresponding SRB. In some aspects, the Cu may send the invalidity indication without sending the RRC message. The sending may be performed, e.g., by the LTM component 199 of the network entity 2302 in FIG. 23. The indication of invalidity may notify the DU of the invalidity. The indication of invalidity may notify the UE of the invalidity. As an example, the indication of invalidity may include a dummy message that notifies the wireless device to discard the message. The use of the dummy message enables the dummy RRC message to include the same PDCP SN as the RRC configuration sent to the first DU.

FIG. 20A is a flowchart 2000 of a method of wireless communication at a wireless device. In some aspects, method may be performed by a UE or a child of a DU. The method may be performed by a UE (e.g., the UE 104, 350, 1302, 1402, 1502, 1602, 1702; the apparatus 2204). The method may help the wireless device to handle a PDCP gap following an LTM change and to avoid an RLF.

At 2002, the wireless device receives, from a cell (e.g., from an DU), an indication of invalidity for at least one of an RRC message for the wireless device updating an LTM candidate configuration or a PDCP SN. In some aspects, the RRC message may be an update for an LTM candidate configuration or other configuration associated with a prior serving cell (e.g., a DU that served a first cell or cell group) and the UE may be served by a different cell (e.g., a DU that serves a second cell or second cell group that serve the UE after an LTM change). The reception may be performed, e.g., by the LTM component 198 of the apparatus 2204 in FIG. 22. The wireless device may be a UE or a child device of the first DU. In some aspects, the CU may be an IAB-CU, the DU may be a component of an IAB node, and the wireless device may be a child device of the IAB-DU. FIG. 14 illustrates various examples of a UE receiving an indication of invalidity from a DU 1412, e.g., at 1432, 1434, and 1436.

At 2004, the wireless device skips the PDCP SN for PDCP reordering. FIG. 14 illustrates an example of a UE skipping PDCP reordering at 1422. The UE may pass the PDCPs to a higher layer without regard to a PDCP SN gap in the PDCPs, for example. The UE may pass the PDCPs to a higher layer without an RLF. The skipping may be performed, e.g., by the LTM component 198 of the apparatus 2204 in FIG. 22.

In some aspects, the wireless device may further receive the RRC message with the indication that the RRC message is invalid. FIG. 14 illustrates an example of a UE 1402 receiving the RRC message at 1432 and 1434, and discarding the message at 1440. The reception may be performed, e.g., by the LTM component 198 of the apparatus 2204 in FIG. 22. In some aspects, the indication may indicate that the PDCP SN is associated with an invalid RRC message. In some aspects, the indication does not include the RRC message. The indication of invalidity may indicate a corresponding SRB.

In some aspects, the wireless device may send a status report (e.g., an RLC report or a PDCP report) to a network that at least a part of the RRC message delivery was missed or may receive a report (e.g., RLC/PDCP report) from a network that the at least the part of the RRC message delivery was skipped.

FIG. 20B is a flowchart 2050 of a method of wireless communication. The method may be performed by a UE (e.g., the UE 104; the apparatus 2204). In some aspects, method may be performed by a UE or a child of a DU. The method may be performed by a UE (e.g., the UE 104, 350, 1302, 1402, 1502, 1602, 1702; the apparatus 2204). The method may help the wireless device to handle a PDCP gap following an LTM change and to avoid an RLF.

At 2052, the wireless device receives, from a first cell (e.g., from a first DU), an LTM indication to change to a second cell or cell group (e.g., served by a second DU) from a set of candidate cells for LTM. FIG. 15 and FIG. 16 illustrate examples of a UE receiving an LTM change MAC-CE from a DU. The reception may be performed, e.g., by the LTM component 198 of the apparatus 2204 in FIG. 22. The wireless device may be a UE or a child device of the first DU.

At 2054, the wireless device receives from the second cell or cell group, an RRC message indicating invalidity of a PDCP SN of the RRC message or comprising an update to an LTM candidate configuration associated with prior serving cell that is served by the first cell. FIGS. 15 and 16 illustrate examples of a UE receiving an RRC message 1532 and 1632. The reception may be performed, e.g., by the LTM component 198 of the apparatus 2204 in FIG. 22.

At 2056, the wireless device identifies that the message is for a prior serving cell or cell group (e.g., a cell or cell group served by the prior DU). The identification may be performed, e.g., by the LTM component 198 of the apparatus 2204 in FIG. 22. FIGS. 15 and 16 illustrate examples of a UE determining that a message is for a prior serving cell (e.g., a prior serving DU). As an example, the RRC message may indicates for the wireless device to skip the PDCP SN, and the wireless device may skip the PDCP SN in PDCP reordering at 2060, e.g., as shown at 1536. In some aspects, the RRC message may comprise a dummy message having a sequence that indicates for the wireless device to skip the PDCP SN.

In some aspects, the RRC message may comprise the update to the LTM candidate configuration for the prior serving cell, the and the UE may update an LTM candidate configuration for the LTM with the prior serving cell, at 2058, while continuing communication via the second cell. An example is described in connection with 1634 in FIG. 16. The update may be performed, e.g., by the LTM component 198 of the apparatus 2204 in FIG. 22. In some aspects, the RRC message comprises the update to the LTM candidate configuration for the first cell, and the wireless device discards the LTM candidate configuration for the LTM with the first cell comprised in the RRC message. FIG. 16 illustrates an example shown at 1636.

The UE may skip transmission of an RLF message based on a gap in the PDCP SN. In some aspects, the wireless device may send first report (e.g., RLC or PDCP report) from the wireless device that at least a part of the RRC message delivery was missed; or receive a second report (e.g., RLC or PDCP report) to the wireless device that the at least the part of the RRC message delivery was skipped. The skipping may be performed, e.g., by the LTM component 198 of the apparatus 2204 in FIG. 22.

Figure 21:
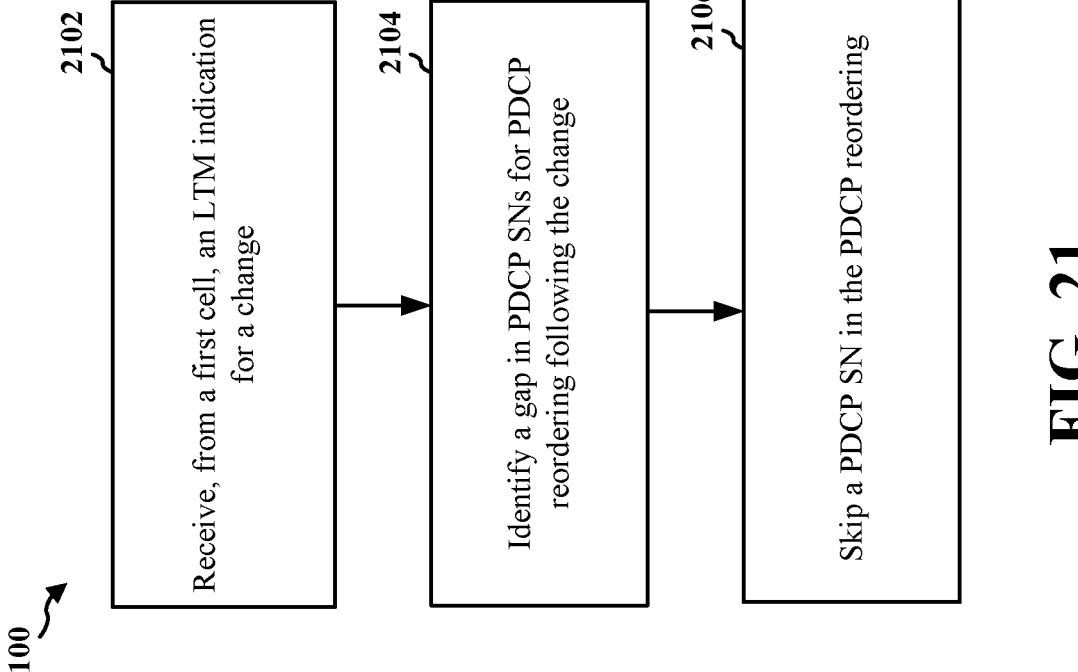
FIG. 21 is a flowchart of a method of wireless communication at a wireless device, in accordance with various aspects of the present disclosure.

FIG. 21 is a flowchart 2100 of a method of wireless communication at a wireless device. In some aspects, method may be performed by a UE or a child of a DU. The method may be performed by a UE (e.g., the UE 104, 350, 1302, 1402, 1502, 1602, 1702; the apparatus 2204). The method may help the wireless device to handle a PDCP gap following an LTM change and to avoid an RLF.

At 2102, the wireless device receives, from a first cell (e.g., from a first DU), an LTM indication for a change to a second cell (e.g., a second DU) from a set of candidate cells for LTM (e.g., a set of candidate DUs). The reception may be performed, e.g., by the LTM component 198 of the apparatus 2204 in FIG. 22. The wireless device may be a UE or a child device of the first DU. FIG. 17 illustrates an example of a UE 1702 that receives an LTM change indication, e.g., at 1724.

At 2104, the wireless device identifies a gap in PDCP SNs for PDCP reordering following the change to the second cell. FIG. 17 illustrates an example of a UE identifying a gap following an LTM change. The identification may be performed, e.g., by the LTM component 198 of the apparatus 2204 in FIG. 22.

At 2106, the wireless device skips a PDCP SN in the PDCP reordering. FIG. 17 illustrates an example of a UE disregarding a PDCP SN gap following an LTM change. The UE may send the PDCPs to a higher layer, e.g., even though there is a PDCP gap, on a condition of the prior LTM change. The skipping may be performed, e.g., by the LTM component 198 of the apparatus 2204 in FIG. 22.

In some aspects, the wireless device may send to a network, an indication of PDCP SN skipping following LTM changes. In some aspects, the wireless device may receive a configuration for PDCP SN skipping following LTM changes, wherein the skipping of the PDCP SN is based on the configuration. In some aspects, the configuration may include a time period for PDCP skipping following LTM changes. As an example, the UE may have a timer that determines the duration within which the UE may perform PDCP skipping following LTM execution. The UE may receive another timer where the UE may only skip PDCP SN upon identifying the gap following the expiry of this other timer. In some aspects, the wireless device may skip the PDCP SN in the PDCP reordering based on a condition for a SRB, e.g., a particular SRB. The configuration may indicate to apply PDCP skipping following LTM for the particular SRB. In some aspects, the PDCP skipping following the LTM may be a default behavior for the particular SRB.

Figure 22:
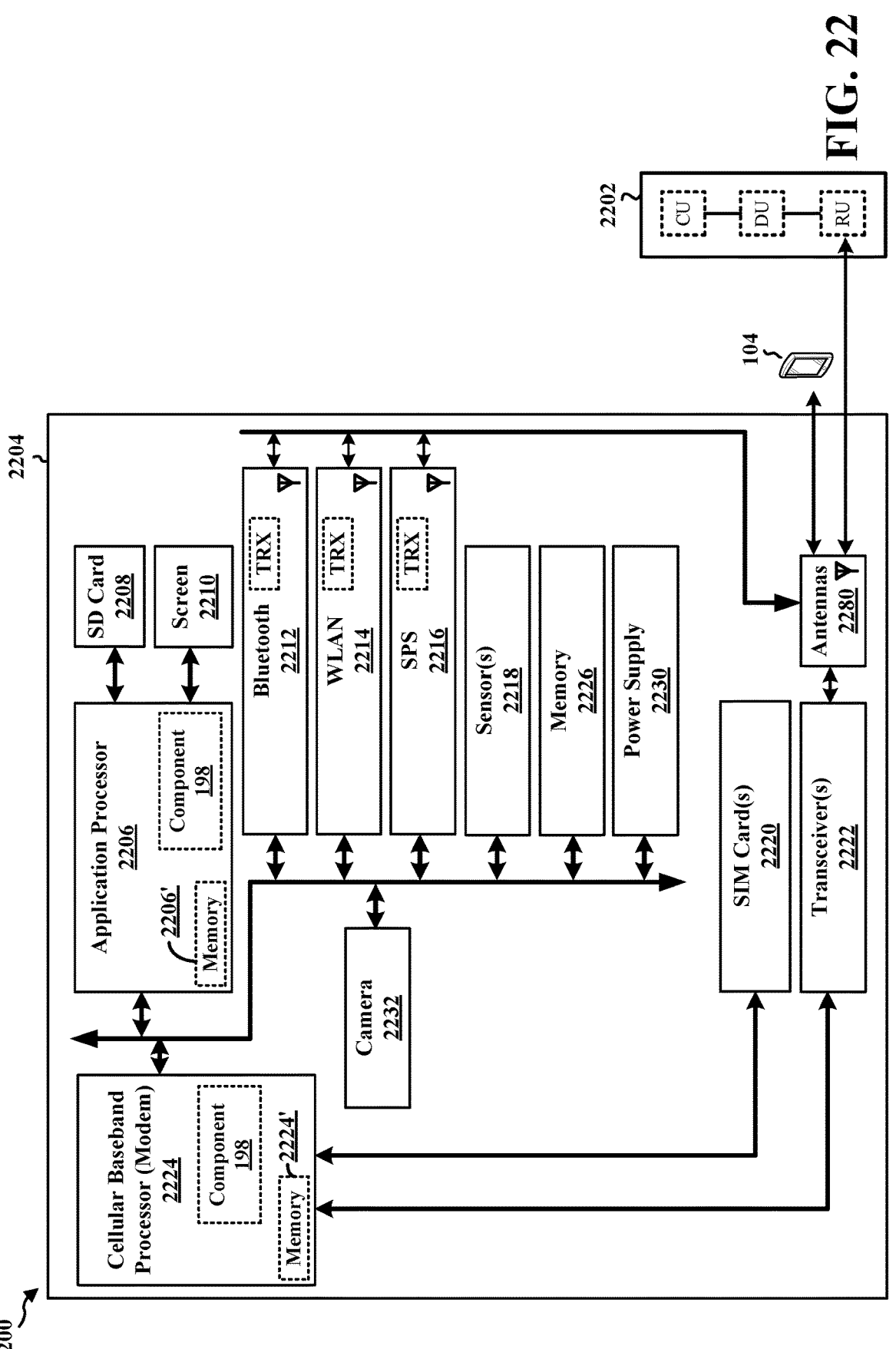
FIG. 22 is a diagram illustrating an example of a hardware implementation for an example apparatus such as a UE, in accordance with various aspects of the present disclosure.

FIG. 22 is a diagram 2200 illustrating an example of a hardware implementation for an apparatus 2204. The apparatus 2204 may be a UE, a component of a UE, or may implement UE functionality. In some aspects, the apparatus 2204 may include at least one cellular baseband processor 2224 (also referred to as a modem) coupled to one or more transceivers 2222 (e.g., cellular RF transceiver). The cellular baseband processor(s) 2224 may include at least one on-chip memory 2224'. In some aspects, the apparatus 2204 may further include one or more subscriber identity modules (SIM) cards 2220 and at least one application processor 2206 coupled to a secure digital (SD) card 2208 and a screen 2210. The application processor(s) 2206 may include on-chip memory 2206'. In some aspects, the apparatus 2204 may further include a Bluetooth module 2212, a WLAN module 2214, an SPS module 2216 (e.g., GNSS module), one or more sensor modules 2218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2226, a power supply 2230, and/or a camera 2232. The Bluetooth module 2212, the WLAN module 2214, and the SPS module 2216 may include an on-chip transceiver (TRX) (or in some cases, just a receiver (RX)). The Bluetooth module 2212, the WLAN module 2214, and the SPS module 2216 may include their own dedicated antennas and/or utilize the antennas 2280 for communication. The cellular baseband processor(s) 2224 communicates through the transceiver(s) 2222 via one or more antennas 2280 with the UE 104 and/or with an RU associated with a network entity 2202. The cellular baseband processor(s) 2224 and the application processor(s) 2206 may each include a computer-readable medium/memory 2224', 2206', respectively. The additional memory modules 2226 may also be considered a computer-readable medium/memory. Each computer-readable medium/memory 2224', 2206', 2226 may be non-transitory. The cellular baseband processor(s) 2224 and the application processor(s) 2206 are each responsible for general processing, including the execution of software stored on the computer-readable medium/memory. The software, when executed by the cellular baseband processor(s) 2224/application processor(s) 2206, causes the cellular baseband processor(s) 2224/application processor(s) 2206 to perform the various functions described supra. The cellular baseband processor(s) 2224 and the application processor(s) 2206 are configured to perform the various functions described supra based at least in part of the information stored in the memory. That is, the cellular baseband processor(s) 2224 and the application processor(s) 2206 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 2224/application processor(s) 2206 when executing software. The cellular baseband processor(s) 2224/application processor(s) 2206 may be a component of the UE 350 and may include the at least one memory 360 and/or at least one of the TX processor 368, the RX processor 356, and the controller/processor 359. In one configuration, the apparatus 2204 may be at least one processor chip (modem and/or application) and include just the cellular baseband processor(s) 2224 and/or the application processor(s) 2206, and in another configuration, the apparatus 2204 may be the entire UE (e.g., see UE 350 of FIG. 3) and include the additional modules of the apparatus 2204.

As discussed supra, the component 198 may be configured to receive, from a cell, an indication of invalidity for at least one of: an RRC message for the wireless device updating an LTM candidate configuration associated with a prior serving cell, or a PDCP SN; and skip the PDCP SN for PDCP reordering. The component 198 or the apparatus 2204 may be further configured to receive the RRC message with the indication that the RRC message is invalid. The component 198 or the apparatus 2204 may be further configured to send a status report to a network that at least a part of an RRC message delivery was missed; or receive from the network that the at least the part of the RRC message delivery was skipped. In some aspects the LTM component 198 may be configured to receive, from a first cell, an LTM indication to change to a second cell from a set of candidate cell for LTM; receive from the second cell, a MAC-CE indicating invalidity of a PDCP SN of the MAC-CE or comprising an update to an LTM candidate configuration associated with the first cell; and identify that the message is for a prior serving cell. Although illustrated for a UE 104, an IAB-MT may include the LTM component. The component 198 or the apparatus 2204 may be configured to skip the PDCP SN in PDCP reordering. The component 198 or the apparatus 2204 may be further configured to update the LTM candidate configuration for the LTM with the prior serving cell while continuing communication via the second cell. The component 198 or the apparatus 2204 may be further configured to discard the LTM candidate configuration for the LTM with the first cell comprised in the RRC message. The component 198 or the apparatus 2204 may be further configured to skip transmission of a RLF message based on a gap in PDCP SNs. The component 198 or the apparatus 2204 may be further configured to send a first report from the wireless device that at least a part of an RRC message delivery was missed; or receive a second report to the wireless device that the at least the part of the RRC message delivery was skipped. The component 198 or the apparatus 2204 may be configured to receive, from a first cell, an LTM indication for a change to a second cell from a set of candidate cells for LTM; identify a gap in PDCP SNs for PDCP reordering following the change to the second cell; and skip a PDCP SN in the PDCP reordering. The component 198 or the apparatus 2204 may be further configured to send, to a network, an indication of PDCP SN skipping following LTM changes. The component 198 or the apparatus 2204 may be further configured to receive a configuration for PDCP SN skipping following LTM changes, wherein the PDCP SN is skipped based on the configuration. The component 198 may be further configured to perform any of the aspects described in connection with the flowcharts in FIG. 20A, 20B, or 21, or any of the aspects performed by the UE in FIGS. 7-17. The component 198 may be within the cellular baseband processor(s) 2224, the application processor(s) 2206, or both the cellular baseband processor(s) 2224 and the application processor(s) 2206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2204 may include a variety of components configured for various functions. In one configuration, the apparatus 2204, and in particular the cellular baseband processor(s) 2224 and/or the application processor(s) 2206, may include means for receiving, from a cell, an indication of invalidity for at least one of: a RRC message for the wireless device updating a LTM candidate configuration, or a PDCP SN; and means for skipping the PDCP SN for PDCP reordering. The apparatus 2204 may include means for receiving the RRC message with the indication that the RRC message is invalid. The apparatus 2204 may include means for sending a status report to a network that at least a part of an RRC message delivery was missed; or means for receiving from the network that the at least the part of the RRC message delivery was skipped. The apparatus 2204 may include means for, from a first cell, a LTM indication to change to a cell or cell group served by a second DU from a set of candidate cells for LTM; means for receiving from the second cell, a RRC message indicating invalidity of a PDCP SN of the RRC message or comprising an update to an LTM candidate configuration associated with a prior serving cell that is served by the first cell; and means for identifying that the RRC message is for the prior serving cell. In some aspects, the RRC message indicates for the wireless device to skip the PDCP SN, and the apparatus includes means for skipping the PDCP SN in PDCP reordering. In some aspects, the RRC message comprises the update to the LTM candidate configuration for the prior serving cell, the apparatus may include means for updating the LTM candidate configuration for the LTM with the prior serving cell while continuing communication via the second cell. In some aspects, the RRC message comprises the update to the LTM candidate configuration for the first cell, and the apparatus includes means for discarding the LTM candidate configuration for the LTM with the first cell comprised in the RRC message. The apparatus 2204 may include means for skipping transmission of a radio link failure (RLF) message based on a gap in the PDCP SNs. The apparatus 2204 may include means for sending a first report from the wireless device that at least a part of an RRC message delivery was missed; or means for receiving a second report to the wireless device that the at least the part of the RRC message delivery was skipped. The apparatus 2204 may include means for receiving, from a cell, a LTM indication for a change to a second cell from a set of candidate cells for LTM; means for identifying a gap in PDCP SNs for PDCP reordering following the change to the second cell; and means for skipping a PDCP SN in the PDCP reordering. The apparatus 2204 may include means for sending, to a network, an indication of PDCP SN skipping following LTM changes. The apparatus 2204 may include means for receiving a configuration for PDCP SN skipping following LTM changes, wherein the PDCP SN is skipped based on the configuration. The apparatus 2204 may include means for performing any of the aspects described in connection with the flowcharts in FIG. 20A, 20B, or 21, or any of the aspects performed by the UE in FIGS. 7-17. The means may be the component 198 of the apparatus 2204 configured to perform the functions recited by the means. As described supra, the apparatus 2204 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 23 is a diagram 2300 illustrating an example of a hardware implementation for a network entity 2302. The network entity 2302 may be a BS, a component of a BS, or may implement BS functionality. The network entity 2302 may include at least one of a CU 2310, a DU 2330, or an RU 2340. For example, depending on the layer functionality handled by the component 199, the network entity 2302 may include the CU 2310; both the CU 2310 and the DU 2330; each of the CU 2310, the DU 2330, and the RU 2340; the DU 2330; both the DU 2330 and the RU 2340; or the RU 2340. The CU 2310 may include at least one CU processor 2312. The CU processor(s) 2312 may include on-chip memory 2312'. In some aspects, the CU 2310 may further include additional memory modules 2314 and a communications interface 2318. The CU 2310 communicates with the DU 2330 through a midhaul link, such as an F1 interface. The DU 2330 may include at least one DU processor 2332. The DU processor(s) 2332 may include on-chip memory 2332'. In some aspects, the DU 2330 may further include additional memory modules 2334 and a communications interface 2338. The DU 2330 communicates with the RU 2340 through a fronthaul link. The RU 2340 may include at least one RU processor 2342. The RU processor(s) 2342 may include on-chip memory 2342'. In some aspects, the RU 2340 may further include additional memory modules 2344, one or more transceivers 2346, antennas 2380, and a communications interface 2348. The RU 2340 communicates with the UE 104. The on-chip memory 2312', 2332', 2342' and the additional memory modules 2314, 2334, 2344 may each be considered a computer-readable medium/memory. Each computer-readable medium/memory may be non-transitory. Each of the processors 2312, 2332, 2342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to send to a CU (e.g., such as an IAB-CU), an indication of an LTM change for a wireless device from the first IAB-DU that to a second IAB-DU and send, after notifying the IAB-CU, a MAC-CE for the wireless device indicating the LTM change to the second IAB-DU. In some aspects, the LTM component 199 may be configured to receive from an IAB-CU, an RRC message for a wireless device updating an LTM candidate configuration associated with a prior serving IAB-DU that previously served the wireless device; and send, to the wireless device served by the IAB-DU, a MAC-CE with a PDCP SN and an indication of invalidity to the wireless device served by the IAB-DU. In some aspects, the network node may be a CU, such as an IAB-CU (e.g., as shown in FIGS. 5 and 6), and the LTM component 199 may be configured to receive, from a first IAB-DU, an indication of an LTM change for a wireless device from the first IAB-DU to a second IAB-DU, and skip sending a candidate configuration associated with the first IAB-DU for the wireless device after receiving the indication of the LTM change to the second IAB-DU. In some aspects, the LTM component 199 may be configured to send an RRC message for a wireless device updating an LTM candidate configuration associated with a prior serving IAB-DU; and send an indication of invalidity for the RRC message. The component may be further configured to perform any of the aspects described in connection with any of FIG. 18A, 18B, 19A, or 19B, or the aspects performed by the DU or CU in FIGS. 7-17. The component 199 may be within one or more processors of one or more of the CU 2310, DU 2330, and the RU 2340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2302 may include a variety of components configured for various functions. In one configuration, the network entity 2302 may include means for sending to a central unit (CU)

an indication of a layer 1/layer 2 triggered mobility (LTM) change for a wireless device from the first DU to a second DU; means for receiving a response from the CU; and means for sending, after notifying the CU, a medium access control-control element (MAC-CE) for the wireless device indicating the LTM change to the second DU. The network entity 2302 may include means for receiving, from a first distributed unit (DU), an indication of an upcoming layer 1/layer 2 triggered mobility (LTM) change for a wireless device from the first DU to a second DU; means for sending a response to the DU; means for skipping sending a candidate configuration associated with the first DU for the wireless device after receiving the indication of the LTM change to the second DU if the response approves the LTM change; and means for sending the candidate configuration associated with the first DU if the response does not approve the LTM change. The network entity 2302 may include means for receiving from a central unit (CU), a first indication of invalidity for a radio resource control (RRC) message for a wireless device updating a layer 1/layer 2 triggered mobility (LTM) candidate configuration associated with a prior serving DU that previously served the wireless device; and means for sending, to the wireless device served by the DU, a second indication of the invalidity associated with a packet data protocol convergence (PDCP) sequence number (SN) for the RRC message. The network entity 2302 may include means for receiving the RRC message from the CU. The network entity 2302 may include means for forwarding the RRC message to the wireless device, wherein the second indication of the invalidity notifies the wireless device that PDCP SN is associated with the RRC message. The network entity 2302 may include means for sending a radio resource control (RRC) message for a wireless device updating a layer 1/layer 2 triggered mobility (LTM) candidate configuration associated with a first distributed unit (DU); means for receiving an unsuccessful delivery indication for the RRC message; and means for sending, to a second DU serving the wireless device, an indication of invalidity for the RRC message. The network entity 2302 may include means for receiving a notification from the first DU that at least a part of a delivery of the RRC message for the wireless device was missed. The network entity 2302 may include means for receiving a first status report from the wireless device that at least a part of an RRC message delivery was missed; or means for providing a second report to the wireless device that the at least the part of the RRC message delivery was skipped. The network entity 2302 may include means for performing the aspects described in connection with any of FIG. 18A, 18B, 19A, or 19B, or the aspects performed by the DU or CU in FIGS. 7-17. The means may be the component 199 of the network entity 2302 configured to perform the functions recited by the means. As described supra, the network entity 2302 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first distributed unit (DU), comprising: sending to a central unit (CU) an indication of a layer 1/layer 2 triggered mobility (LTM) change for a wireless device from the first DU to a second DU; receiving a response from the CU; and sending, after notifying the CU, a medium access control-control element (MAC-CE) for the wireless device indicating the LTM change to the second DU.

In aspect 2, the method of aspects 1 further includes that the wireless device is a UE or a child device of the first DU.

Aspect 3 is an apparatus for wireless communication at a network node comprising memory, and at least one processor coupled to the memory and configured, based at least in part on information stored in the memory, to perform the method of any of aspects 1-2.

Aspect 4 is an apparatus for wireless communication at a network node comprising means for performing the method of any of aspects 1-2.

In aspect 5, the apparatus of aspect 3 or 4 further includes at least one transceiver.

Aspect 6 is a computer-readable medium (e.g., a non-transitory computer-readable medium) storing computer executable code at a network node, the code when executed by a processor causes the processor to perform the method of any of aspects 1-2.

Aspect 7 is a method of wireless communication at a central unit (CU), comprising: receiving, from a first distributed unit (DU), an indication of an upcoming layer 1/layer 2 triggered mobility (LTM) change for a wireless device from the first DU to a second DU; sending a response to the DU; skipping sending a candidate configuration associated with the first DU for the wireless device after receiving the indication of the LTM change to the second DU if the response approves the LTM change; and sending the candidate configuration associated with the first DU if the response does not approve the LTM change.

In aspect 8, the method of aspect 7 further includes that the wireless device is a UE or a child device of the first DU.

Aspect 9 is an apparatus for wireless communication at a network node comprising memory, and at least one processor coupled to the memory and configured, based at least in part on information stored in the memory, to perform the method of any of aspects 7-8.

Aspect 10 is an apparatus for wireless communication at a network node comprising means for performing the method of any of aspects 7-8.

In aspect 11, the apparatus of aspect 9 or 10 further includes at least one transceiver.

Aspect 12 is a computer-readable medium (e.g., a non-transitory computer-readable medium) storing computer executable code at a network node, the code when executed by a processor causes the processor to perform the method of any of aspects 7-8.

Aspect 13 is a method of wireless communication at a distributed unit (DU), comprising: receiving from a central unit (CU), a first indication of invalidity for a radio resource control (RRC) message for a wireless device updating a layer 1/layer 2 triggered mobility (LTM) candidate configuration associated with a prior serving DU that previously served the wireless device; and sending, to the wireless device served by the DU, a second indication of the invalidity associated with a packet data protocol convergence (PDCP) sequence number (SN) for the RRC message.

In aspect 14, the method of aspect 13 further includes receiving the RRC message from the CU.

In aspect 15, the method of aspect 13 or aspect 14 further includes forwarding the RRC message to the wireless device, wherein the second indication of the invalidity notifies the wireless device that PDCP SN is associated with the RRC message.

In aspect 16, the method of any of aspects 13 or 14 further includes that the DU indicates that the PDCP SN is associated with an invalid RRC message without forwarding the RRC message.

Aspect 17 is an apparatus for wireless communication at a network node comprising memory, and at least one processor coupled to the memory and configured, based at least in part on information stored in the memory, to perform the method of any of aspects 13-16.

Aspect 18 is an apparatus for wireless communication at a network node comprising means for performing the method of any of aspects 13-16.

In aspect 19, the apparatus of aspect 17 or 18 further includes at least one transceiver.

Aspect 20 is a computer-readable medium (e.g., a non-transitory computer-readable medium) storing computer executable code at a network node, the code when executed by a processor causes the processor to perform the method of any of aspects 13-16.

Aspect 21 is a method of wireless communication at a central unit (CU), comprising: sending a radio resource control (RRC) message for a wireless device updating a layer 1/layer 2 triggered mobility (LTM) candidate configuration associated with a first distributed unit (DU); receiving an unsuccessful delivery indication for the RRC message; and sending, to a second DU serving the wireless device, an indication of invalidity for the RRC message.

In aspect 22, the method of aspect 21 further includes that the indication of the invalidity notifies the DU of the invalidity.

In aspect 23, the method of aspect 21 further includes that the indication of the invalidity notifies the wireless device of the invalidity.

In aspect 24, the method of aspect 21 or 23 further includes that the indication of the invalidity comprises a dummy message that notifies the wireless device to discard the message.

In aspect 25, the method of any of aspects 21 to 24 further includes that the indication of the invalidity indicates a corresponding SRB.

In aspect 26, the method of any of aspects 21 to 25 further includes receiving a notification from the first DU that at least a part of a delivery of the RRC message for the wireless device was missed.

In aspect 27, the method of any of aspects 21 to 26 further includes receiving a first status report from the wireless device that at least a part of an RRC message delivery was missed; or providing a second report to the wireless device that the at least the part of the RRC message delivery was skipped.

Aspect 28 is an apparatus for wireless communication at a network node comprising memory, and at least one processor coupled to the memory and configured, based at least in part on information stored in the memory, to perform the method of any of aspects 21-27.

Aspect 29 is an apparatus for wireless communication at a network node comprising means for performing the method of any of aspects 21-27.

In aspect 30, the apparatus of aspect 28 or 29 further includes at least one transceiver.

Aspect 31 is a computer-readable medium (e.g., a non-transitory computer-readable medium) storing computer executable code at a network node, the code when executed by a processor causes the processor to perform the method of any of aspects 21-27.

Aspect 32 is a method of wireless communication at wireless device, comprising: receiving, from a cell, an indication of invalidity for at least one of: a RRC message for the wireless device updating a LTM candidate configuration, or a PDCP SN; and skipping the PDCP SN for PDCP reordering.

In aspect 33, the method of aspect 32 further includes that the indication of the invalidity is for an RRC message for updating the LTM candidate configuration associated with a prior serving cell.

In aspect 34, the method of aspect 32 or 33 further includes receiving the RRC message with the indication that the RRC message is invalid.

In aspect 35, the method of any of aspects 32-34 further includes that the indication indicates that the PDCP SN is associated with an invalid RRC message.

In aspect 36, the method of any of aspects 32, 33, or 35 further includes that the indication does not include the RRC message.

In aspect 37, the method of any of aspects 32-36 further includes that the indication of the invalidity indicates a corresponding SRB.

In aspect 38, the method of any of aspects 32-37 further includes at least one of: sending a status report to a network that at least a part of an RRC message delivery was missed; or receiving from the network that the at least the part of the RRC message delivery was skipped.

Aspect 39 is an apparatus for wireless communication at a wireless device comprising memory, and at least one processor coupled to the memory and configured, based at least in part on information stored in the memory, to perform the method of any of aspects 32-38.

Aspect 40 is an apparatus for wireless communication at a wireless device comprising means for performing the method of any of aspects 32-38.

In aspect 41, the apparatus of aspect 39 or 40 further includes at least one transceiver.

Aspect 42 is a computer-readable medium (e.g., a non-transitory computer-readable medium) storing computer executable code at a wireless device, the code when executed by a processor causes the processor to perform the method of any of aspects 32-38.

Aspect 43 is a method of wireless communication at a wireless device, comprising: receiving, from a first cell, an LTM indication to change to a second cell or cell group (e.g., served by a second DU) from a set of candidate cells for LTM; receiving from the second cell or cell group, an RRC message indicating invalidity of a PDCP SN of the RRC message or comprising an update to an LTM candidate configuration associated with a prior serving cell that is served by the first cell; and identifying that the RRC message is for the prior serving cell.

In aspect 44, the method of aspect 43 further includes that the RRC message indicates for the wireless device to skip the PDCP SN, the method further comprising: skipping the PDCP SN in PDCP reordering.

In aspect 45, the method of aspect 44 further includes that the RRC message comprises a dummy message having a sequence that indicates for the wireless device to skip the PDCP SN.

In aspect 46, the method of aspect 43 further includes that the RRC message comprises the update to the LTM candidate configuration for the prior serving cell, the method further comprising: updating the LTM candidate configuration for the LTM with the prior serving cell while continuing communication via the second cell.

In aspect 47, the method of aspects 43, 44, or 45 further includes that the RRC message comprises the update to the LTM candidate configuration for the first cell, the method further comprising: discarding the LTM candidate configuration for the LTM with the first DU comprised in the RRC message.

In aspect 48, the method of any of aspects 43-47 further includes skipping transmission of an RLF message based on a gap in the PDCP SNs.

In aspect 49, the method of any of aspects 43-48 further includes sending a first report from the wireless device that at least a part of an RRC message delivery was missed; or receiving a second report to the wireless device that the at least the part of the RRC message delivery was skipped.

Aspect 50 is an apparatus for wireless communication at a wireless device comprising memory, and at least one processor coupled to the memory and configured, based at least in part on information stored in the memory, to perform the method of any of aspects 43-49.

Aspect 51 is an apparatus for wireless communication at a wireless device comprising means for performing the method of any of aspects 43-49.

In aspect 52, the apparatus of aspect 50 or 51 further includes at least one transceiver.

Aspect 53 is a computer-readable medium (e.g., a non-transitory computer-readable medium) storing computer executable code at a wireless device, the code when executed by a processor causes the processor to perform the method of any of aspects 43-49.

Aspect 54 is a method of wireless communication at a wireless device, comprising: receiving, from a cell, a layer 1/layer 2 triggered mobility (LTM) indication for a change to a second cell from a set of candidate cells for LTM; identifying a gap in packet data protocol convergence (PDCP) sequence numbers (SNs) for PDCP reordering following the change to the second cell; and skipping a PDCP SN in the PDCP reordering.

In aspect 55, the method of aspect 54 further includes sending, to a network, an indication of PDCP SN skipping following LTM changes.

In aspect 56, the method of aspect 54 or 55 further includes receiving a configuration for PDCP SN skipping following LTM changes, wherein the PDCP SN is skipped based on the configuration.

In aspect 57, the method of aspect 56 further includes that the configuration includes a time period for PDCP skipping following the LTM change.

In aspect 58, the method of aspect 56 or 57 further includes that the configuration includes a time period for deferring the PDCP SN skipping following the LTM changes.

In aspect 59, the method of any of aspects 54-58 further includes that the wireless device skips the PDCP SN in the PDCP reordering based on a condition for a signaling radio bearer (SRB).

Aspect 60 is an apparatus for wireless communication at a wireless device comprising memory, and at least one processor coupled to the memory and configured, based at least in part on information stored in the memory, to perform the method of any of aspects 54-59.

Aspect 61 is an apparatus for wireless communication at a wireless device comprising means for performing the method of any of aspects 54-59.

In aspect 62, the apparatus of aspect 60 or 61 further includes at least one transceiver.

Aspect 63 is a computer-readable medium (e.g., a non-transitory computer-readable medium) storing computer executable code at a wireless device, the code when executed by a processor causes the processor to perform the method of any of aspects 54-59.

What is claimed is:

1. An apparatus for wireless communication at wireless device, comprising:
   a memory; and
   at least one processor coupled to the memory and, based at least in part on information stored in the memory, the at least one processor, individually or in any combination, is configured to cause the wireless device to:
   receive, from a cell, an indication of invalidity for at least one of:
      a radio resource control (RRC) message for the wireless device updating a layer 1/layer 2 triggered mobility (LTM) candidate configuration, or
      a packet data protocol convergence (PDCP) sequence number (SN); and
   skip the PDCP SN for PDCP reordering.

2. The apparatus of claim 1, wherein the indication of the invalidity is for an RRC message for updating the LTM candidate configuration associated with a prior serving cell.

3. The apparatus of claim 1, wherein the at least one processor, individually or in any combination, is further configured to cause the wireless device to:
   receive the RRC message with the indication that the RRC message is invalid.

4. The apparatus of claim 1, wherein the indication indicates that the PDCP SN is associated with an invalid RRC message.

5. The apparatus of claim 1, wherein the indication does not include the RRC message.

6. The apparatus of claim 1, wherein the indication of the invalidity indicates a corresponding signal radio bearer (SRB).

7. The apparatus of claim 1, wherein the at least one processor, individually or in any combination, is further configured to cause the wireless device to:
   send a status report to a network that at least a part of an RRC message delivery was missed; or
   receive from the network that the at least the part of the RRC message delivery was skipped.

8. The apparatus of claim 1, further comprising at least one transceiver coupled to the at least one processor.

9. An apparatus for wireless communication at a wireless device, comprising:
   a memory; and
   at least one processor coupled to the memory and, based at least in part on information stored in the memory, the at least one processor, individually or in any combination, is configured to cause the wireless device to:

receive, from a first cell, a layer 1/layer 2 triggered mobility (LTM) indication to change to a second cell or cell group from a set of candidate cells for LTM;
   receive from the second cell or cell group, a radio resource control (RRC) message indicating invalidity of a packet data protocol convergence (PDCP) sequence number (SN) of the RRC message or comprising an update to an LTM candidate configuration associated with a prior serving cell that is served by the first cell; and
   identify that the RRC message is for the prior serving cell.

10. The apparatus of claim 9, wherein the RRC message indicates for the wireless device to skip the PDCP SN, wherein the at least one processor, individually or in any combination, is further configured to cause the wireless device to:
   skip the PDCP SN in PDCP reordering.

11. The apparatus of claim 10, wherein the RRC message comprises a dummy message having a sequence that indicates for the wireless device to skip the PDCP SN.

12. The apparatus of claim 9, wherein the RRC message comprises the update to the LTM candidate configuration for the prior serving cell, wherein the at least one processor, individually or in any combination, is further configured to cause the wireless device to:
   update the LTM candidate configuration for the LTM with the prior serving cell while continuing communication via the second cell.

13. The apparatus of claim 9, wherein the RRC message comprises the update to the LTM candidate configuration for the first cell, wherein the at least one processor, individually or in any combination, is further configured to cause the wireless device to:
   discard the LTM candidate configuration for the LTM with the first cell comprised in the RRC message.

14. The apparatus of claim 13, wherein the at least one processor, individually or in any combination, is further configured to cause the wireless device to:
   skip transmission of a radio link failure (RLF) message based on a gap in PDCP SNs.

15. The apparatus of claim 9, wherein the at least one processor, individually or in any combination, is further configured to cause the wireless device to:
   send a first report from the wireless device that at least a part of an RRC message delivery was missed; or
   receive a second report to the wireless device that the at least the part of the RRC message delivery was skipped.

16. The apparatus of claim 9, further comprising at least one transceiver coupled to the at least one processor.

17. An apparatus for wireless communication at a wireless device, comprising:
   a memory; and
   at least one processor coupled to the memory and, based at least in part on information stored in the memory, the at least one processor, individually or in any combination, is configured to cause the wireless device to:
   receive, from a first cell, a layer 1/layer 2 triggered mobility (LTM) indication for a change to a second cell from a set of candidate cells for LTM;
   identify a gap in packet data protocol convergence (PDCP) sequence numbers (SNs) for PDCP reordering following the change to the second cell; and
   skip a PDCP SN in the PDCP reordering.

18. The apparatus of claim 17, wherein the at least one processor, individually or in any combination, is further configured to cause the wireless device to:

send, to a network, an indication of PDCP SN skipping following LTM changes.

19. The apparatus of claim 17, wherein the at least one processor, individually or in any combination, is further configured to cause the wireless device to:

receive a configuration for PDCP SN skipping following LTM changes, wherein the PDCP SN is skipped based on the configuration.

20. The apparatus of claim 19, wherein the configuration includes a time period for PDCP skipping following the LTM changes.

21. The apparatus of claim 19, wherein the configuration includes a time period for deferring the PDCP SN skipping following the LTM changes.

22. The apparatus of claim 17, wherein the wireless device skips the PDCP SN in the PDCP reordering based on a condition for a signaling radio bearer (SRB).

23. The apparatus of claim 19, further comprising at least one transceiver coupled to the at least one processor.

*   *   *   *   *